(12) United States Patent
Koda et al.

(10) Patent No.: US 7,869,318 B2
(45) Date of Patent: *Jan. 11, 2011

(54) WRITE ONCE RECORDING MEDIUM, RECORDER AND RECORDING METHOD FOR WRITE ONCE RECORDING MEDIUM, REPRODUCER AND REPRODUCING METHOD FOR WRITE ONCE RECORDING MEDIUM, COMPUTER PROGRAM FOR CONTROLLING RECORDING OR REPRODUCTION, AND DATA STRUCTURE

(75) Inventors: Takeshi Koda, Saitama (JP); Masayoshi Yoshida, Saitama (JP); Keiji Katata, Saitama (JP)

(73) Assignee: Pioneer Corporation, Tokyo (JP)

( * ) Notice: Subject to any disclaimer, the term of this patent is extended or adjusted under 35 U.S.C. 154(b) by 1127 days.

This patent is subject to a terminal disclaimer.

(21) Appl. No.: 10/565,076

(22) PCT Filed: Jul. 22, 2004

(86) PCT No.: PCT/JP2004/010768

§ 371 (c)(1),
(2), (4) Date: Jan. 18, 2006

(87) PCT Pub. No.: WO2005/008657

PCT Pub. Date: Jan. 27, 2005

(65) Prior Publication Data

US 2007/0041284 A1    Feb. 22, 2007

(30) Foreign Application Priority Data

Jul. 23, 2003   (JP) .............................. 2003-200303

(51) Int. Cl.
    *G11B 7/00*   (2006.01)

(52) U.S. Cl. .............. 369/53.15; 369/30.07; 369/44.32; 369/275.3

(58) Field of Classification Search ............. 369/30.07, 369/275.3, 44.32, 53.17, 53.15
    See application file for complete search history.

(56) References Cited

U.S. PATENT DOCUMENTS

| 5,914,928 | A  | * | 6/1999 | Takahashi ............... 369/47.14 |
| 7,233,550 | B2 | * | 6/2007 | Park et al. ............... 369/47.14 |
| 2003/0137909 | A1 | * | 7/2003 | Ito et al. ................. 369/47.14 |

(Continued)

FOREIGN PATENT DOCUMENTS

EP    0 350 920    1/1990

(Continued)

*Primary Examiner*—Wayne R Young
*Assistant Examiner*—Dionne H Pendleton
(74) *Attorney, Agent, or Firm*—Young & Thompson

(57) ABSTRACT

A write-once-type recording medium (100) on which record data can be recorded only once, provided with: a data area (108) to record therein the record data; and a shared area (104, 105) to temporarily record therein evacuation data which is record data to be recorded or already recorded at a position of a defect in the data area and defect management information (120) including an evacuation source address of the evacuation data, the evacuation data being recorded with one predetermined point which exists in the shared area as a start point, the defect management information being recorded with another predetermined point which exists at a different point from the one point as a start point, in the shared area.

9 Claims, 12 Drawing Sheets

U.S. PATENT DOCUMENTS

| | | | |
|---|---|---|---|
| 2004/0165495 A1* | 8/2004 | Park et al. | 369/47.14 |
| 2005/0025003 A1* | 2/2005 | Park | 369/47.14 |
| 2006/0187811 A1* | 8/2006 | Koda et al. | 369/275.3 |
| 2007/0174312 A1* | 7/2007 | Koda et al. | 707/100 |
| 2007/0174359 A1* | 7/2007 | Koda et al. | 707/203 |
| 2007/0229997 A1* | 10/2007 | Koda et al. | 360/1 |
| 2008/0005610 A1* | 1/2008 | Koda et al. | 714/5 |
| 2008/0101181 A1* | 5/2008 | Hwang et al. | 369/47.14 |
| 2008/0304383 A1* | 12/2008 | Yamamoto et al. | 369/53.17 |
| 2010/0085852 A1* | 4/2010 | Park et al. | 369/53.17 |

FOREIGN PATENT DOCUMENTS

| | | |
|---|---|---|
| EP | 0 991 071 | 4/2000 |
| EP | 1 132 914 | 9/2001 |
| JP | 63-124270 | 5/1988 |
| JP | 05-108441 | 4/1993 |
| JP | 11-066751 | 3/1999 |
| JP | 2000-03161 | 2/2000 |
| JP | 2000-195178 | 7/2000 |
| JP | 2000-357374 | 12/2000 |
| JP | 2002-312940 | 10/2002 |
| JP | 2003-505813 | 2/2003 |
| WO | 2004/029939 | 4/2004 |
| WO | 2004/029941 | 4/2004 |
| WO | 2004/081922 | 9/2004 |

* cited by examiner

- Start Address of User Data Area
- End Address of User Data Area
- Size of Inner Shared Area
- Size of Outer Shared Area
- Other Info.

| Defect Address | Spare Recording Address | Other Info. |
|---|---|---|
| Address aaaa | Address gggg | |
| Address bbbb | Address kkkk | |
| Address cccc | Address mmmm | |
| Address dddd | Address nnnn | |
| ⋮ | ⋮ | |

WRITE ONCE RECORDING MEDIUM, RECORDER AND RECORDING METHOD FOR WRITE ONCE RECORDING MEDIUM, REPRODUCER AND REPRODUCING METHOD FOR WRITE ONCE RECORDING MEDIUM, COMPUTER PROGRAM FOR CONTROLLING RECORDING OR REPRODUCTION, AND DATA STRUCTURE

TECHNICAL FIELD

The present invention relates to a write-once-type recording medium, an apparatus for and a method of recording record data onto the write-once-type recording medium, an apparatus for and a method of reproducing the record data recorded on the write-once-type recording medium, a computer program for recording or reproduction control, and a data structure.

BACKGROUND ART

As a technique of improving the reliability of the recording and reading of record data on a high-density recording medium, such as an optical disc, a magnetic disc, and a magneto optical disc, there is defect management. Namely, if there are scratches or dusts, or deterioration (which are collectively referred to as a "defect") on the recording medium, data to be recorded or already recorded at the position of the defect is recorded into another area on the recording medium (which is referred to as a "spare area"). As described above, by evacuating, to the spare area, the record data which is possibly imperfectly or incompletely recorded or read because of the defect, it is possible to improve the reliability of the recording and reading of the record data (refer to Japanese Patent Application Laying Open NO. Hei 11-185390).

In general, a defect list is generated to perform the defect management. On the defect list, there are recorded address information for indicating the position of a defect on the recording medium, and address information for indicating a position in the spare area (e.g. a recording position in the spare area) to which the data to be recorded or already recorded at the position of the defect is evacuated.

In general, the defect list is generated when the recording medium is initialized or formatted. The defect list is also generated when the record data is recorded onto the recording medium. If the record data is recorded and rewritten several times, the defect list is generated or updated every time the record data is recorded and rewritten.

When the record data is recorded onto the recording medium, the defect list is referred to. This allows the recording of the record data onto the recording medium away from the position of a defect. On the other hand, the defect list is also referred to when the record data recorded on the recording medium is reproduced. This makes it possible to surely read both the record data recorded in a normal recording area and the record data recorded in the spare area because of the presence of a defect, on the basis of the defect list.

The defect list is generally recorded into a specific area on the recording medium, which is a target for the generation or update of the defect list. The defect list is read from the recording medium when the record data recorded on the recording medium is reproduced next time or when other record data is rewritten or additionally recorded next time. Then the defect list is referred to in a recording operation by a recording apparatus or in a reproduction operation by a reproducing apparatus.

DISCLOSURE OF INVENTION

By the way, the defect list is recorded into a specific area on the recording medium. For example, with respect to a rewritable optical disc using a blue laser, the defect list is recorded into a predetermined area (which is hereinafter referred to as a "defect management area") reserved in a lead-in area or lead-out area on the disc. Then, the record data to be recorded at the position where the defect is originally present is also recorded into a specific area on the recording medium.

As described above, the defect list is updated every time the record data is recorded and rewritten. Then, the defect list is overwritten into the defect management area on the recording medium, which is the recording and rewriting target, every time the defect list is updated by the recording and rewriting of record data. In addition, the record data to be originally recorded at the position where the defect is present is also overwritten or additionally recorded or written once into a specific area on the recording medium.

Such updating of the defect list by rewriting it can be realized only in a case where the recording medium is a rewritable-type. If the recording medium is a so-called write-once-type recording medium, for example, a write-once-type optical disc, every time the defect list is updated, the updated defect list is additionally recorded into a new unrecorded area on the write-once-type recording medium.

However such additional recording causes the following problem, in terms of the disc standard. Namely, if it is difficult to record more defect lists because of a limit in the recording capacity of the defect management area, for example, it is difficult or impossible to generate a new defect list even if there is a space area in the spare area. Alternatively, if it is difficult to record more data to be recorded or already recorded at the position of a defect into the spare area because of a limit in the recording capacity of the spare area, it is difficult to record a new defect list even if there is a space area in the defect management area. Therefore, there is such a technical problem that although there is a space area on the recording medium, it is not possible to record the data any more onto the disc since the defect management cannot be performed.

It is therefore an object of the present invention to provide: a write-once-type recording medium which allows the efficient and maximum use of the recording capacity of the recording medium and which allows proper defect management; an apparatus for and a method of recording the record data onto the write-once-type recording medium; an apparatus for and a method of reproducing the record data recorded on the write-once-type recording medium, a computer program used on the recording or reproducing apparatus, and a data structure.

The present invention will be discussed below.

(Write-Once-Type Recording Medium)

The above object of the present invention can be achieved by a write-once-type recording medium on which record data can be recorded only once, provided with: a data area to record therein the record data; and a shared area to temporarily record therein evacuation data which is record data to be recorded or already recorded at a position of a defect in the data area and defect management information including an evacuation source address of the evacuation data, the evacuation data being recorded with one predetermined point which exists in the shared area as a start point, the defect management information being recorded with another predetermined point which exists at a different point from the one point as a start point, in the shared area.

According to the write-once-type recording medium of the present invention, it is possible to record the record data, which is the data targeted for the reproduction or execution and which includes a series of contents, such as image data, audio data, text data, content data, and a computer program, into the data area. Then, it is possible to properly record and reproduce the record data recorded in the data area, by recording information which indicates the attribute and type of the write-once-type recording medium of the present invention, information for the address management of the record data, and information for controlling the recording operation and the reading operation of a drive apparatus, into the control information recording area. Incidentally, the record data and control information cannot be always clearly distinguished, in accordance with the content thereof However, the control information is mainly information directly used for the operation control of the drive apparatus, while the record data is mainly data which is merely a recording and reading target and is mainly used in the data reproduction process or program execution process of a backend or host computer.

Into the shared area, the defect management information of the data area is temporary recorded, and the evacuation data, which is the record data to be recorded at the original position of a defect or the record data already recorded at the position, is recorded. The "defect management information" in the present invention is information used for the defect management, and includes the evacuation source address which is the address of the position of a defect in the data area and the evacuation destination address which is an address of the recording position of the evacuation data which is the record data to be originally recorded or already recorded at the position of the defect. The defect management is as follows. If there is a defect, such as scratches, dusts, and deterioration, in or on the write-once-type recording medium of the present invention, the record data is recorded away from the position of the defect. At the same time, the evacuation data is recorded into the spare area. Moreover, the following processes i.e., a process of recognizing the position of a defect upon reproducing the record data recorded on the write-once-type recording medium; and a process of reading the evacuation data from the spare area are also performed as a part of the defect management.

Then, for example, the shared area is an area to record therein the defect management information until the write-once-type recording medium of the present invention is finalized, for example. Therefore, for example, until the write-once-type recording medium is finalized, if the information on the write-once-type recording medium is reproduced, the defect management is performed by reading the defect management information from the shared area.

Particularly in the present invention, the evacuation data is recorded in the shared area, in addition to the defect management information, as described above. In particular, the evacuation data is recorded with one point in the shared area as the start point, and the defect management information is recorded with another point as the start point. In other words, in the shared area, there are provided, in a pseudo way or virtually, a recording area for the defect management information, which is a surrounding area of the one point, and a recording area for the evacuation data, which is a surrounding area of the another point. In practice, the recording area for the defect management information and the recording area for the evacuation data are not provided. As long as it does not go beyond the limit of the shared area, it is possible to record the defect management information and the evacuation data. In other words, as compared to a write-once-type recording medium in which the area to record therein the defect management information is separated from the area to record therein the evacuation data (i.e. a write-once-type recording medium having a defect management area and a spare area), it is possible to use the shared area, more efficiently.

Specifically discussing, in the write-once-type having the separated two areas for recording (e.g. a defect management area to record therein the defect management information and a spare area to record therein the evacuation data), the defect management cannot be performed after a time point that there is no more space area in the recording capacity of either one of the areas for recording. In other words, if there is a space area in the other area for recording, there arises such a disadvantage that the record data cannot be recorded onto the write-once-type recording medium at a time point that there is no more space area in either one of the areas for recording. According to the write-once-type recording medium of the present invention, however, it is not provided with such two separated areas for recording properly, so that the above-mentioned disadvantage is not caused. In other words, in the shared area, the defect management information and the evacuation data can be both recorded, with the one point or another point as the start point, respectively, so that there does not arise such a disadvantage that the recording cannot be performed in either one of the areas in advance. Therefore, if there is a space area in the shared area, the defect management can be performed properly, and as a result, it is possible to record the record data more.

Incidentally, even in the case of the write-once-type having the two areas for recording, it may be also considered that the above-mentioned disadvantage can be avoided by increasing each of the areas for recording. In this case, however, due to the restriction in the standard that a recording capacity per a write-once-type recording medium unit is not changed, there is also such an adverse effect that the recording capacity of an area where user data can be recorded (i.e. user data area) is reduced. Moreover, there is also such a technical problem that it is impossible to properly cope with a case where one of the defect management information and the evacuation data has a larger data amount than that of the other, or similar cases.

On the other hand, by providing the shared area, as in the present invention, even if the defect management information is larger than the evacuation data, or on the contrary if the evacuation data is larger than the defect management information, the defect management can be performed if there is a space area in the shared area. In other words, from the viewpoint that the two areas for recording (i.e. the shared area in the present invention) are used more efficiently and properly, it can be said that the write-once-type recording medium of the present invention is extremely excellent and it has a great advantage.

Then, in the write-once-type recording medium, the record data recorded in the user data area is read while the defect management information is read by the operation of a reproducing apparatus described later. Then, it is possible to reproduce a series of contents, by reproducing the evacuation data from the shared area, on the basis of the defect management information. In addition, by finding a defect even during the reproduction, it is possible to properly reproduce the record data, while the defect management information is sequentially updated.

Consequently, according to the write-once-type recording medium of the present invention, it is possible to realize the write-once-type recording medium on which the defect management can be performed. In particular, by recording both the defect management information and the evacuation data into the shared area, it is possible to record and reproduce the record data while performing the defect management with using the recording capacity of the shared area, efficiently and to the greatest extent. Therefore, it is possible to perform the proper defect management while efficiently using the recording capacity of the write-once-type recording medium.

Incidentally, there may be one point and another point in the write-once-type recording medium of the present invention, or there may be a plurality of one points and a plurality of other points.

In one aspect of the write-once-type recording medium of the present invention, the evacuation data is continuously recorded with the one point as the start point and the defect management information is continuously recorded with the another point as the start point, in said shared area.

According to this aspect, for example, since the evacuation data and the defect management information are continuously recorded, the evacuation data is recorded in an area around the one point. In addition, the defect management information is recorded in an area around the another point. Therefore, it is possible to substantially distinguish the evacuation data corresponding to entity information and the defect management information corresponding to control information, in the shared area.

In another aspect of the write-once-type recording medium of the present invention, the one point corresponds to one end point in said shared area, and the another point corresponds to the other end point which faces the one end point in said shared area.

According to this aspect, it is possible to clearly distinguish an area where each of the defect management information and the evacuation data are recorded, in the shared area. For example, in the write-once-type recording medium in a disc shape, such as a DVD, one end point may correspond to the outer circumferential side of the shared area (more preferably, a point located on the most outer circumference), and another end point may correspond to the inner circumferential side of the shared area (more preferably, a point located on the most inner circumference). In this case, the defect management information is recorded on the inner circumferential side of the shared area, while the evacuation data is recorded on the outer circumferential side.

In another aspect of the write-once-type recording medium of the present invention, the evacuation data and the defect management information are each recorded, repeatedly, a plurality of times, in the shared area.

According to this aspect, it is possible to increase the reliability of the recording of the defect management information, by recording the defect management information having the same content, into the shared area in the one time recording operation, repeatedly, a plurality of times (e.g. twice), with the defect management information arranged redundantly, for example. In other words, it is possible to furthermore increase the reliability of the record data improved by the defect management.

In another aspect of the write-once-type recording medium of the present invention, the write-once-type recording medium is provided with a plurality of shared areas.

According to this aspect, it is possible to perform the defect management, properly, by using the plurality of shared areas. Moreover, if the write-once-type recording medium of the present invention is a two-layer disc, one or the plurality of shared areas may be provided in each layer.

In addition, for example, if the shared area is associated with a predetermined area unit of the user data area, for example, it is possible to read the defect management information and the evacuation data which are required, from the shared area, relatively easily and efficiently.

In another aspect of the write-once-type recording medium of the present invention, it is further provided with a control information recording area to record therein information for controlling at least one of operations of recording and reading in the data area, the control information recording area including a definite defect management area to record therein defect management information of the data area.

According to this aspect, it is possible to maintain compatibility between the write-once-type recording medium of the present invention and a rewritable type recording medium, for example.

For example, the definite defect management area is an area to record therein the defect management information when the recording medium is finalized, and thus the defect management information is not updated anymore, and the content of the defect management information is determined. Therefore, if the write-once-type recording medium is finalized before the reproduction, the defect management is performed by reading the defect management information from the definite defect management area.

In addition, the definite defect management area is disposed in the control information recording area. In many information recording media of a rewritable type which is generally popular, the defect management area is disposed in the control information recording area. Moreover, even in many information recording media of a rewritable type which will be developed, it is expected that the defect management area is disposed in the control information recording area. Therefore, in the present invention, it is possible to provide compatibility with the rewritable type recording medium of the same standard because it adopts the same structure of such a general rewritable type recording medium. As a result, it is possible to properly reproduce the information on the write-once-type recording medium of the present invention on various reproducing apparatuses of a reproduce-only type and of a rewritable type. Therefore, there is an extremely large advantage in the point of easy diffusion to the public.

Incidentally, the definite defect management area may be narrower than the shared area. This is because it is only necessary to record at least one defect management information whose content is determined.

Along with that, the shared area is preferably larger than the definite defect management area. This is to record a plurality of defect management information in accordance with the number of updated times of the defect management information. In this regard, it is considered that the updated defect management information cannot be overwritten at the same position because the write-once-type recording medium of the present invention is a write-once-type recording medium in which the recording is performed only once.

Moreover, the definite defect management area may be provided not only in the control information recording area disposed on the inner circumferential side of the write-once-type recording medium of the present invention but also in the control information recording area disposed on the outer circumferential side of the write-once-type recording medium, as in the above-mentioned shared area. Furthermore, in the case of a two-layer disc, one or more definite defect management areas may be provided in each layer.

In an aspect of the write-once-type recording medium provided with the control information recording area, as described above, the shared area is disposed between the control information recording area and the data area.

According to this aspect, it is possible to reserve or ensure the shared area without expanding the control information recording area, by disposing the shared area out of the control information recording area. As described above, the shared area is relatively large, so if this is disposed in the control information recording area, it will be forced to expand the control information recording area. However, by disposing the shared area between the control information recording area and the data area, it is possible to provide the shared area on the write-once-type recording medium of the present invention, without expanding the control information recording area and without disposing the shared area in the data area. Thus, there is an extremely great advantage that it is possible to provide the compatibility between the write-once-type recording medium of the present invention and the general rewritable type recording medium.

In another aspect of the write-once-type recording medium of the present invention, the defect management information includes: definition information which indicates the position of the data area; and a defect list including defect position information which indicates a position of a defect in the data area (i.e. an evacuation source address which is an address of the position of the defect described above) and spare area position information which indicates a position of a spare area to alternatively record therein the record data to be recorded at the position of the defect (i.e. an evacuation destination address which is a recoding position of the evacuation data, for example).

According to this aspect, it is possible to perform the defect management, more properly, by using the defect list. In other words, in the case of a reproducing apparatus described later, it is possible to reproduce a series of contents, more properly.

(Recording Apparatus and Method)

The above object of the present invention can be also achieved by a recording apparatus for recording record data onto a write-once-type recording medium on which record data can be recorded only once, comprising: a data area to record therein the record data; and a shared area to temporarily record therein evacuation data which is record data to be recorded or already recorded at a position of a defect in the data area and defect management information including an evacuation source address of the evacuation data, the recording apparatus provided with: a first recording device for recording the record data into the data area; and a second recording device for recording the evacuation data and the defect management information into the shared area, the second recording device recording the evacuation data with one predetermined point which exists in the shared area as a start point, the second recording device recording the defect management information with another predetermined point which exists at a different point from the one point as a start point, in the shared area.

According to the recording apparatus of the present invention, it is possible to properly record the record data onto the above-mentioned write-once-type recording medium of the present invention, by using the first and second recording devices which include an optical pickup and a controller for controlling the optical pickup, and the like, for example.

Specifically, the first recording device records the record data into the data area of the write-once-type recording medium. On the other hand, on the recording apparatus of the present invention, the defect management information including the defect list, for example, which indicates the position or the like of a defect on the write-once-type recording medium, is generated. Alternatively, it may be obtained through the recording medium or another communication channel. At this time, this defect management information may be stored into a storing device which includes a memory, such as a RAM, for example. The second recording device records the defect management information into the shared area of the write-once-type recording medium. There are various possibilities of when the second recording device records the defect management information into the shared area; however, it is considered to be immediately after the write-once-type recording medium is initialized or formatted, immediately after a series of the record data is recorded onto the write-once-type recording medium, and the like. In addition, the second recording device records the evacuation data into the spare area.

Particularly in the present invention, the second recording device records both the defect management information and the evacuation data into the shared area. Therefore, it is possible to record the record data onto the write-once-type recording medium of the present invention (including its various aspects), relatively easily. Then, if there is a space area in the shared area, as described above, it is possible to record the record data while performing the defect management, properly.

Consequently, according to the recording apparatus of the present invention, it is possible to properly record the record data onto the above-mentioned write-once-type recording medium of the present invention, and receive the various benefits owned by the write-once-type recording medium. Moreover, it is also possible to receive a benefit of improvement of a processing performance in the recording operation.

Incidentally, the recording apparatus of the present invention may also adopt various aspects, in response to various aspects of the write-once-type recording medium of the present invention mentioned above.

Moreover, if the write-once-type recording medium is an optical type recording medium, an optical pickup is preferable as a device for directly recording the data or information onto the write-once-type recording medium. If the write-once-type recording medium is of another type, such as a magnetic type, a magneto optical type, and a type using the change of a dielectric constant, a pickup, head, probe, or the like which suits the type of the write-once-type recording medium may be used.

Incidentally, hardware which constitutes the first and second recording devices may be provided with a plurality of sets for each recording device; however, one set will normally do. For example, one optical pickup and one controller may be provided, and two types of software for controlling the controller may be provided in accordance with each recording device.

Moreover, the second recording device may record the defect management information, repeatedly a plurality of times, into the shared area. By this, it is possible to surely hold the defect management information on the write-once-type recording medium.

In addition, an area setting device may be further provided to set the size of the shared area and the position of the data area in accordance with the size of the shared area which is set. For example, if the shared area is set to be large or wide, it is possible to record more defect management information into the shared area. In other words, in this case, the defect management information can be recorded in parallel and many times, so that it is possible to record each defect management information, even if the number of updating times reaches many. By this, even if the recording medium is used in a bad environment where a defect occurs frequently, it is possible to maintain or increase the reliability of the recording and reproduction of the record data. Moreover, it is possible to increase the number of the defect management information with the same content to be repeatedly recorded, to thereby increase certainty about the recording of the defect management information. On the other hand, if the shared area is set to be small or narrow, the data area can be ensured to be large or wide by that much, so that it is possible to increase the practical recording capacity of the write-once-type recording medium. If the range setting of the shared area performed by the area setting device is entrusted to a user, it is possible to properly set the shared area, in accordance with the aspect of how the user uses the write-once-type recording medium.

In one aspect of the recording apparatus of the present invention, the second recording device continuously records the evacuation data with the one point as the start point, the one point corresponding to one end point in the shared area, and said second recording device continuously records the defect management information with the another point as the start point, the another point corresponding to the other end point which faces the one end point in said shared area.

According to this aspect, since the evacuation data and the defect management information are continuously recorded in the shared area, the evacuation data is recorded into an area around one point. In addition, the defect management information is recorded in an area around another point. Therefore, it is possible to substantially distinguish the evacuation data corresponding to the entity information and the defect management information corresponding to the control information.

The above object of the present invention can be also achieved by a recording method of recording record data onto a write-once-type recording medium on which record data can be recorded only once, comprising: a data area to record therein the record data; and a shared area to temporarily record therein evacuation data which is record data to be recorded or already recorded at a position of a defect in the data area and defect management information including an evacuation source address of the evacuation data, the recording method provided with: a first recording process of recording the record data into the data area; and a second recording process of recording the evacuation data and the defect management information into the shared area, the second recording process recording the evacuation data with one predetermined point which exists in the shared area as a start point, the second recording process recording the defect management information with another predetermined point which exists at a different point from the one point as a start point, in the shared area.

According to the recording method of the present invention, as in the above-mentioned recording apparatus of the present invention, it is possible to properly record the record data onto the write-once-type recording medium of the present invention (including its various aspects).

Incidentally, the recording method of the present invention may also adopt various aspects, in response to various aspects of the recording apparatus (or write-once-type recording medium) of the present invention mentioned above.

(Reproducing Apparatus and Method)

The above object of the present invention can be also achieved by a reproducing apparatus for reproducing the record data recorded on the above-mentioned write-once-type recording medium of the present invention, the reproducing apparatus provided with: a reading device for reading the defect management information recorded in the shared area; and a reproducing device for reproducing the record data recorded in the data area or the evacuation data recorded in the spare area, on the basis of the defect management information.

According to the reproducing apparatus of the present invention, it is possible to properly reproduce the record data recorded on the above-mentioned write-once-type recording medium of the present invention, by using the reading device, which includes an optical pickup, a controller for recording the optical pickup, and the like, and the reproducing device, which includes a decoder for converting the image data to an image signal which allows the display of the image data on a display, and the like.

Specifically, at first, the reading device reads the defect management information recorded in the shared area. At this time, the defect management information may be stored into the storing device, such as a memory, for example. Upon recording, the record data is recorded away from a defect which exists in the data area of the recording medium. Thus, in order to reproduce the record data recorded in this manner, it is necessary to know the position of the defect in the data area upon the recording. Thus, the reproducing device learns the position of the defect in the data area, on the basis of the defect management information stored in the storing device, and recognizes the recording position of the record data recorded away from the defect, to thereby reproduce the record data recorded in the data area or the evacuation data recorded in the spare area.

Consequently, according to the reproducing apparatus of the present invention, it is possible to certainly and properly reproduce the record data recorded on the above-mentioned write-once-type recording medium of the present invention while performing the defect management by using the defect management information recorded in the shared area.

Incidentally, the reproducing apparatus of the present invention may also adopt various aspects, in response to various aspects of the write-once-type recording medium of the present invention mentioned above.

Incidentally, in reading the defect management information, the newest defect management information recorded in the shared area may be read by searching for the border point of the recorded-area where the defect management information is recorded and the unrecorded-area where the defect management information is not recorded. In other words, every time the defect management information is updated, the new defect management information is continuously, sequentially and additionally recorded. Thus, just as the border point is specified so it is possible to specify a position where the newest defect management information is recorded. In other words, it is possible to specify the position where the newest defect management information is recorded, without relatively complicated calculation of the address position or the like (e.g. operation by using a pointer or the like, conversion from a logical address to a physical address, etc.). By this, it is possible to further improve a processing performance related to the reproducing operation (e.g. speed-up, etc.).

Incidentally, the recording apparatus and the reproducing apparatus described above may be realized in such a form that they are unified with hardware as an exclusive apparatus, or may be realized by loading or reading a program into a computer.

The above object of the present invention can be also achieved by a reproducing method of reproducing the record data recorded on the above-mentioned write-once-type recording medium of the present invention, the reproducing method provided with: a reading process of reading the defect management information recorded in the shared area; and a reproducing process of reproducing the record data recorded in the data area or the evacuation data recorded in the spare area, on the basis of the read defect management information.

According to the reproducing method of the present invention, as in the reproducing apparatus of the present invention, it is possible to properly reproduce the record data recorded on the above-mentioned write-once-type recording medium of the present invention (including its various aspects).

Incidentally, the reproducing method of the present invention may also adopt various aspects, in response to various aspects of the reproducing apparatus of the present invention mentioned above.

(Computer Program)

The above object of the present invention can be also achieved by a computer program for recording control to control a computer disposed in the above-mentioned recording apparatus of the present invention (including its various aspects), the program making the computer function as at least one portion of the first recording device and the second recording device.

According to the computer program for recording control of the present invention, the recording apparatus of the present invention mentioned above may be realized relatively easily, by running the computer program from a recording medium, such as a ROM, a CD-ROM, a DVD-ROM, a hard disk and so on, which stores the computer program thereon, as the firmware of the recording apparatus, or by downloading the computer program to the computer via the communication device and running it.

Incidentally, the computer program for recording control of the present invention may also adopt various aspects, in association with various aspects of the write-once-type recording medium of the present invention mentioned above.

The above object of the present invention can be also achieved by a computer program for reproduction control to control a computer disposed in the above-mentioned reproducing apparatus of the present invention (including its various aspects), the program making the computer function as at least one portion of the reading device and the reproducing device.

According to the computer program for reproduction control of the present invention, the reproducing apparatus of the present invention mentioned above may be realized relatively easily, by running the computer program from a recording medium, such as a ROM, a CD-ROM, a DVD-ROM, a hard disk and so on, which stores the computer program thereon, or by downloading the computer program to the computer via the communication device and running it.

Incidentally, the computer program for reproduction control of the present invention may also adopt various aspects, in association with various aspects of the write-once-type recording medium of the present invention mentioned above.

The above object of the present invention can be also achieved by a computer program product for recording control in a computer-readable medium for tangibly embodying a program of instructions executable by a computer provided for the above-mentioned recording apparatus of the present invention (including its various aspects), the program making the computer function as at least one portion of the first recording device and the second recording device.

The above object of the present invention can be also achieved by a computer program product for reproduction control in a computer-readable medium for tangibly embodying a program of instructions executable by a computer provided for the above-mentioned reproducing apparatus of the present invention (including its various aspects), the program making the computer function as at least one portion of the reading device and the reproducing device.

According to the computer program product for the recording or reproduction control of the invention, at least one portion of the first recording device, the second recording device, the reading device and the reproducing device of the present invention mentioned above may be embodied relatively easily, by reading and running the computer program product from a record medium, such as a ROM, a CD-ROM, a DVD-ROM, a hard disk and so on, which stores the computer program thereon, or by downloading the computer program product to the computer via the communication device and running it. More specifically, the computer program product may be made of computer readable codes (or computer readable commands) to make the computer function as at least one portion of the first recording device, the second recording device, the reading device and the reproducing device.

(Data Structure)

The above object of the present invention can be also achieved by a data structure provided with: a data area to record therein the record data; and a shared area to temporarily record therein evacuation data which is record data to be recorded or already recorded at a position of a defect in the data area and defect management information including an evacuation source address of the evacuation data, the evacuation data being recorded with one predetermined point which exists in the shared area as a start point, the defect management information being recorded with another predetermined point which exists at a different point from the one point as a start point, in the shared area.

According to the data structure including the control signal of the present invention, similarly to the case of the write-once-type recording medium of the present invention as mentioned above, by recording the defect management information and the evacuation data into the shared area, it is possible to record and reproduce the record data while using the recording capacity of the shared area, efficiently and to the greatest extent, and performing the defect management.

Incidentally, the data structure including the control signal of the present invention may also adopt various aspects, in association with various aspects of the write-once-type recording medium of the present invention mentioned above.

These effects and other advantages of the present invention become more apparent from the following embodiments and examples.

As explained above, according to the write-once-type recording medium of the present invention, it is provided with: the data area; and the shared area, and the defect management information is recorded with one point as the start point, and the evacuation data is recorded with another point as the start point, in the shared area. Therefore, it is possible to record and reproduce the record data while using the recording capacity of the shared area (or the write-once-type recording medium), efficiently and to the greatest extent, and performing the defect management.

Moreover, according to the recording apparatus or method of the present invention, it is provided with the first recording device and the second recording device, or the first recording process and the second recording process, respectively. Thus, it is possible to properly record the record data onto the write-once-type recording medium of the present invention. Moreover, according to the reproducing apparatus or method of the present invention, it is provided with the reading device and the reproducing device, or the reading process and the reproducing process, respectively. Thus, it is possible to properly read and reproduce the record data from the write-once-type recording medium of the present invention.

BEST MODE FOR CARRYING OUT THE INVENTION

The embodiments of the present invention will be explained with reference to the drawings hereinafter. In the embodiments below, the write-once-type recording medium of the present invention is applied to a write-once-type optical disc, and the recording apparatus and the reproducing apparatus of the present invention are applied to a recording/reproducing apparatus for the write-once-type optical disc.

Embodiment of Recording Medium

Figure 1:
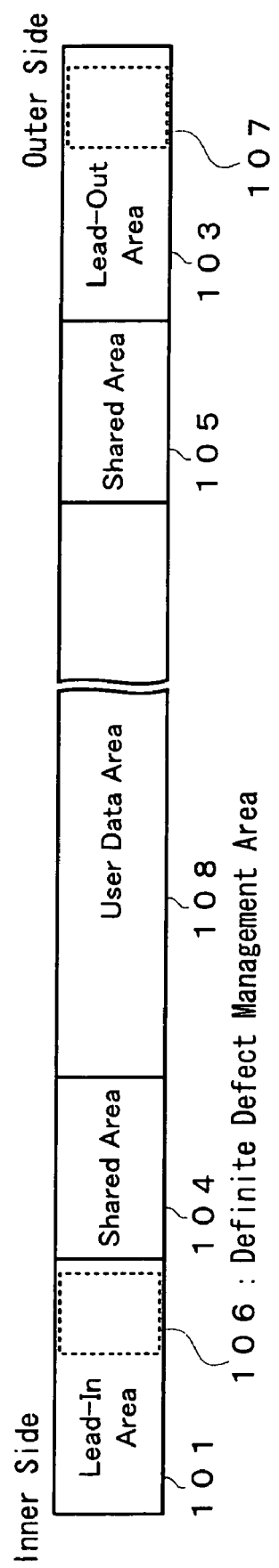
FIG. 1 is an explanatory diagram showing an embodiment of a write-once-type recording medium of the present invention.

The recording structure of the write-once-type optical disc in the embodiment of the present invention, and information and data recorded on the optical disc will be discussed. FIG. 1 shows the recording structure of the write-once-type recording medium in the embodiment of the present invention. Incidentally, the left side of FIG. 1 is the inner circumferential side of a write-once-type optical disc 100, and the right side is the outer circumferential side of the write-once-type optical disc 100.

As shown in FIG. 1, on the recording surface of the write-once-type optical disc 100, there are: a lead-in area 101 on the inner circumferential side; a user data zone 108 on the outer circumferential side of the lead-in area 101; and a lead-out area 103 on the outer circumferential side of the user data area 108. Moreover, a shared area 104 is located between the lead-in area 101 and the user data area 108. Furthermore, a shared area 105 is located between the user data area 108 and the lead-out area 103.

In each of the lead-in area 101 and the lead-out area 103, there are recorded control information for controlling and management information for managing the recording and reading of the information or data with respect to the optical disc 100. The lead-in area 101 is provided with a definite defect management area 106. The lead-out area 103 is also provided with a definite defect management area 107. In each of the definite defect management areas 106 and 107, there is recorded defect management information 120 (refer to FIG. 2).

The record data, such as image data, audio data, and content data, is recorded into the user data area 108.

The defect management information 120 is temporarily recorded into each of the shared areas 104 and 105. Incidentally, the defect management information 120 is also recorded into each of the definite defect management areas 106 and 107. A difference in the definite defect management areas 106 and 107 and the shared areas 104 and 105 will be discussed later.

Moreover, the shared areas 104 and 105 are spare areas (or alternative recording areas) for evacuating the record data from a defect in the user data area 108. In other words, if there is a defect in the user data area 108, the record data to be recorded or already recorded at the position of the defect (hereinafter referred to as "evacuation data", as occasion demands) is alternatively recorded into the shared area 104 or 105.

Incidentally, with respect to the shared area 104 or 105, the present invention is not limited to an aspect related to the two shared areas, but there may be provided one shared area, or more shared areas, for example.

Next, the defect management information 120 will be discussed. The defect management information 120 is information used for the defect management performed by a recording/reproducing apparatus 200 (refer to FIG. 6). The recording/reproducing apparatus 200 performs the defect management when recording the record data onto the optical disc 100 or when reproducing the record data from the optical disc 100. In the embodiment, the defect management is mainly as follows. If there is a defect, such as scratches, dusts, and deterioration, on the user data area 108 of the optical disc 100, the record data is recorded away from the position of the defect. At the same time, the evacuation data is recorded into the shared area 104 or 105. Moreover, the following processes i.e., a process of recognizing the position of a defect upon reproducing the record data recorded on the optical disc 100; and a process of reading the record data to be originally recorded or already recorded at the position of the defect, from the shared area 104 or 105 are also performed as a part of the defect management. In order to perform such defect management, the recording/reproducing apparatus 200 needs to recognize the presence position of the defect or the like in the user data area 108. The defect management information 120 is mainly used for the recording/reproducing apparatus 200 to recognize the presence position or the like of the defect.

Figures 2, 3:
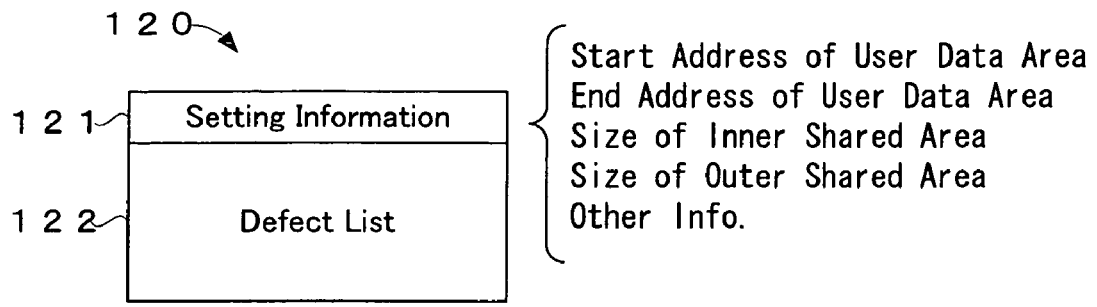
FIG. 2 is an explanatory diagram showing the content of defect management information in the embodiment.
FIG. 3 is an explanatory diagram showing one example of a defect list in the embodiment.

FIG. 2 shows the content of the defect management information 120. As shown in FIG. 2, the defect management information 120 includes setting information 121 and a defect list 122.

As shown in FIG. 2, the setting information 121 includes: the start address of the user data area 108; the end address of the user data area 108; the size of the inner shared area 104; the size of the outer shared area 105; and other information.

FIG. 3 shows the content of the defect list 122. As shown in FIG. 3, on the defect list 122, there are recorded an address for indicating the position of a defect in the user data area 108 (which is hereinafter referred to as a "defect address"), an address for indicating the recording position in the shared area 104 or 105 of the record data to be recorded or already recorded at the position of the defect (which is hereinafter referred to as a "spare address" (i.e. "spare recording address")); and other information In other words, the defect address indicates one example of the "evacuation source address" of the present invention, and the spare recording address indicates one example of the "evacuation destination address" of the present invention. If there are a plurality of defects in the user data area 108, a plurality of defect addresses corresponding to the defects and a plurality of spare addresses are recorded onto the defect list 122.

Incidentally, the defect management can be performed not only in the user data area 108 of the optical disc 100 but also on the entire recording surface of the optical disc 100.

Next, the recording aspect of the defect management information 120 will be discussed. All the shared areas 104 and 105 and the definite defect management areas 106 and 107 are areas to record therein the defect management information 120; however, the shared areas 104 and 105 and the definite defect management areas 106 and 107 have differences in location, size, and purpose for use. The differences of the both areas will be discussed below.

Figure 4:
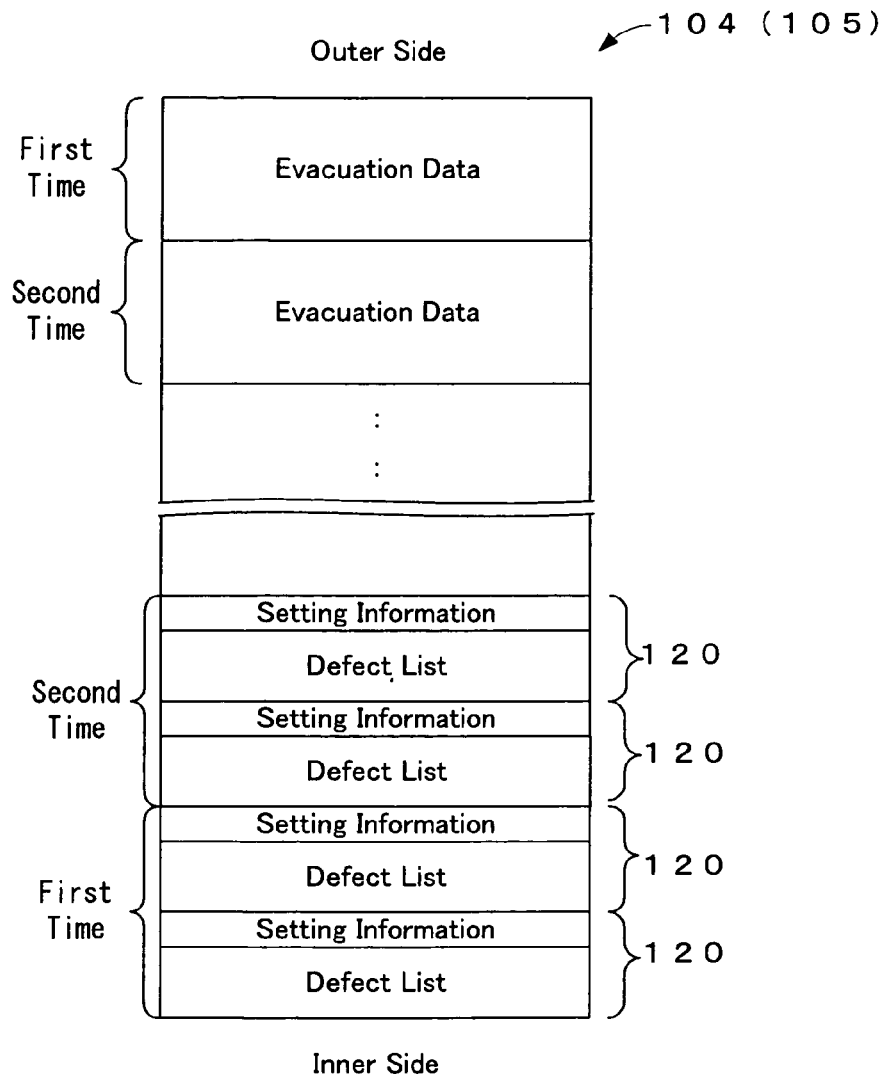
FIG. 4 is an explanatory diagram showing one example of the recoding content of a shared area in the embodiment.

FIG. 4 shows one example of a state in which the defect management information 120 is recorded in the shared area 104 or 105.

The shared areas 104 and 105 are areas to temporarily record therein the defect management information 120 until the optical disc 100 is finalized. The defect management information 120 is information necessary for the defect management. The presence or absence of a defect and its position differ on the individual optical disc, so that it is necessary to record the defect management information on the individual optical disc. In the embodiment, before the finalizing, the defect management information 120 is recorded in the shared area 104 or 105 of the optical disc 100.

In addition, the evacuation data is recorded into the shared area 104 or 105. In the embodiment, the defect management information 120 is recorded from the inner circumferential side of the optical disc 100, and the evacuation data is recorded from the outer circumferential side of the optical disc 100. The defect management information 120 may be recorded from the outer circumferential side of the optical disc 100, and the evacuation data may be recorded from the inner circumferential side of the optical disc 100. Alternatively, it is not limited to this, the defect management information 120 may be recorded from a predetermined point in the shared area 104 or 105, and the evacuation data may be recorded from another predetermined point which does not overlap the predetermined point.

Moreover, in the embodiment, as shown in FIG. 4, it is preferable to record the defect management information 120 into the shared area 104 or 105, repeatedly, twice (incidentally, since FIG. 4 shows a state in which the repetitive recording of the defect management information 120 is performed twice, four defect management information 120 and two evacuation data in total are illustrated). By this, it is possible to surely record and surly reproduce the defect management information 120. Even if not recorded twice, for example, recorded once or recorded three time or more, the defect management information 120 and the evacuation data can be recorded and reproduced, properly.

There is a case where the defect management information 120 is updated several times until the optical disc 100 is finalized. For example, if some dirt is attached to the optical disc 100 between the first recording and the second recording (additional recording), the defect (dirt) is detected upon the second recording, and on the basis of this, the defect list 122 is updated. If the defect list 122 is updated, the defect management information 120 including the updated defect list 122 is additionally recorded into the shared area 104 or 105. In addition, the evacuation data is also recorded into the shared area 104 or 105. Since the optical disc 100 is a write-once-type recording medium, it is impossible to record the updated defect management information 120 over the existing defect management information 120. Thus, as shown in FIG. 4, the updated defect management information 120 and the evacuation data are recorded continuously after the existing defect management information 120 and evacuation data.

In order to realize such repetitive and parallel recording of the defect management information 120, the shared areas 104 and 105 are larger than the definite defect management areas 106 and 107.

Figure 5:
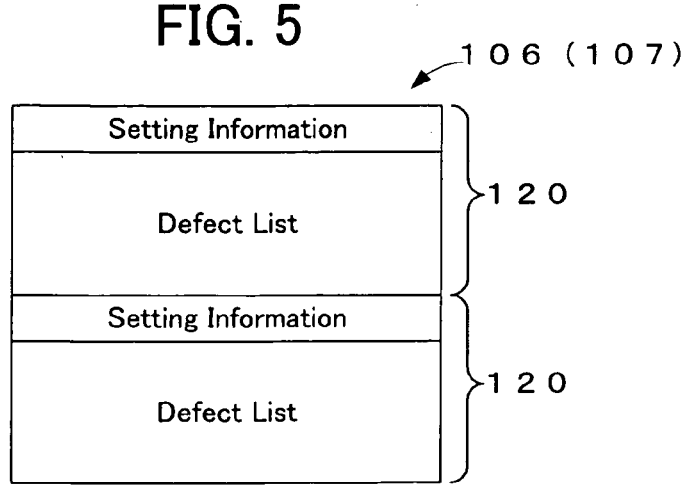
FIG. 5 is an explanatory diagram showing one example of the recoding content of a definite defect management area in the embodiment.

On the other hand, FIG. 5 shows one example of a state in which the defect management information 120 is recorded in the definite defect management area 106 or 107. The definite defect management areas 106 and 107 are areas to definitely record therein the defect management information 120 when the optical disc 100 is finalized. In other words, before the finalizing, the definite defect management areas 106 and 107 are unrecorded. After the finalizing, the defect management information 120 is recorded into the definite defect management areas 106 and 107, and after that, the recording state is continued.

In the embodiment, as shown in FIG. 5, it is preferable to record the defect management information 120 into the definite defect management area 106 or 107, repeatedly, twice. By this, it is possible to surely record and surly reproduce the defect management information 120. Even if not recorded twice, for example, recorded once or recorded three time or more, the defect management information 120 can be recorded and reproduced, properly.

According to the optical disc 100 in the embodiment, since the shared area 104 is disposed between the lead-in area 101 and the user data area 108, and the shared area 105 is disposed between the user data area 108 and the lead-out area 103, it is possible to provide compatibility between the write-once-type optical disc 100 and a general rewritten-type optical disc. This is because in order to realize the compatibility with the rewritten-type optical disc, there needs to be the lead-in area, the user data area, and the lead-out area, and there is a need to maintain the basic recording structure, such as the order, location, and size (dimensions) of the areas. This is also because in the optical disc 100, although it is provided with the shared areas 104 and 105, the optical disc 100 maintains the basic recording structure. In other words, if the shared area 104 is disposed in the lead-in area 101, there arises such a disadvantage that the size of the lead-in area 101 is to be expanded because the shared area 104 is relatively large, as described above. In the embodiment, however, the shared area 104 is disposed out of the lead-in area 101, which does not cause such a disadvantage. Moreover, if the shared area 104 is disposed in the user data area 108, there arises such a disadvantage that the defect management information 120, which has a character of the control information, is mixed into the user data area 108 which is an area to record therein the record data. And the information with different characters, such as the control information and the record data, is mixed in the user data area 108. In the embodiment, since the shared area 104 is disposed out of the user data area 108, such a disadvantage does not occur. The same is true for the shared area 105.

Incidentally, the start address and end address of the user data area 108, the size of the shared area 104, and the size of the shared areas 105 are included in the setting information 121 of the defect management information 120 (refer to FIG. 2). Then, the setting information 121 can be set by the recording/reproducing apparatus 200. In other words, the start address and end address of the user data area 108, the size of the shared area 104, and the size of the shared area 105 are allowed to be changed, if expressed as the setting information 121. Even if the start address and end address of the user data are 108, the size of the shared area 104 and the size of the shared area 105 are changed, it is possible to maintain the compatibility with the general rewritable-type recording medium. Therefore, if the start address of the user data area 108 is shifted backward (to the outer circumferential side), it is possible to ensure or reserve a space between the lead-in area 101 and the user data area 108, and dispose the shared area 104 in the space. Moreover, depending on how to set the start address of the user data area 108, it is possible to reserve the shared area 104 which is relatively large (of a relatively large size). The same is true for the shared area 105.

Moreover, according to the optical disc 100 in the embodiment, since the definite defect management areas 106 and 107 are disposed in the lead-in area 101 and the lead-out area 103, respectively, it is possible to provide the compatibility between the write-once-type optical disc 100 and the general rewritten-type optical disc. In other words, on the general rewritten-type optical disc, an area to record the defect management information is disposed in both the lead-in area and the lead-out area thereof. Then, even on the optical disc 100, the definite defect management areas 106 and 107 are disposed in the lead-in area 101 and the lead-out area 103. In this point, the both disc has the same recording structure. Therefore, it is possible to provide the compatibility between the write-once-type optical disc 100 and the general rewritten-type optical disc.

Moreover, particularly in the embodiment, in addition to providing the shared area 104 or 105 as an area to temporary record therein the defect management information 120, the shared area 104 or 105 is an area where the evacuation data can be also recorded. Therefore, as compared to an optical disc in which an area to record therein the defect management information 120 is separated from an area to record therein the evacuation data, the extremely efficient use is possible from the following viewpoint.

Namely, in the optical disc in the comparison, if the recording is completed in either one of the two areas until the limit of the recording capacity, for example, either the defect management information 120 or the evacuation data is no longer recorded. Therefore, even if there is a space in the other area, the defect management is difficult or impossible, so that it is not possible to record the record data any more onto the optical disc.

According to the optical disc 100 in the embodiment, however, the recording areas are not separated like the optical disc in the comparison, and the defect management information 120 and the evacuation data are recorded into the same recording area. This does not cause the above-described disadvantage that the record data cannot be recorded although there is still a space area, which is caused by the fact that the recording is completed first until the limit of the recording capacity in either the area to record therein the defect management information 120 or the area to record therein the evacuation data. In other words, it is possible to use the recording capacity (specially, the recording capacity of the shared area) to the greatest extent, by using the shared area corresponding to the above-mentioned two areas for recording. In addition, even in the case where the data capacity of the defect management information 120 is larger than that of the evacuation data, and on the contrary, in the case where the data capacity of the evacuation data is larger than that of the defect management information 120, or in similar cases, if there is a space area in the shared area, these data can be recorded properly, and this results in the proper defect management.

In addition, the recording capacity of the shared area can be set to have a predetermined size, by virtue of the setting information 121. Thus, if it is expected that the defect occurs frequently, it is possible to make the large recording capacity of the shared area 104 or 105 in advance. Alternatively, if it is expected that the defect does not occur frequently because of the sophisticated manufacturing technique of the optical disc 100, for example, it is possible to make the small recording capacity of the shared area 104 or 105 in advance. By this, it is possible to reserve the user data area 108 which is necessary, and it is also possible to perform the optimum defect management depending on the situation.

Incidentally, even in the case of an optical disc having the three or more shared areas, if the defect management information 120 and the evacuation data are mixed and continuously recorded, as described above, in at least one shared area, it is possible to receive the various benefits owned by the optical disc described above.

Embodiment of Recording/Reproducing Apparatus

Figure 6:
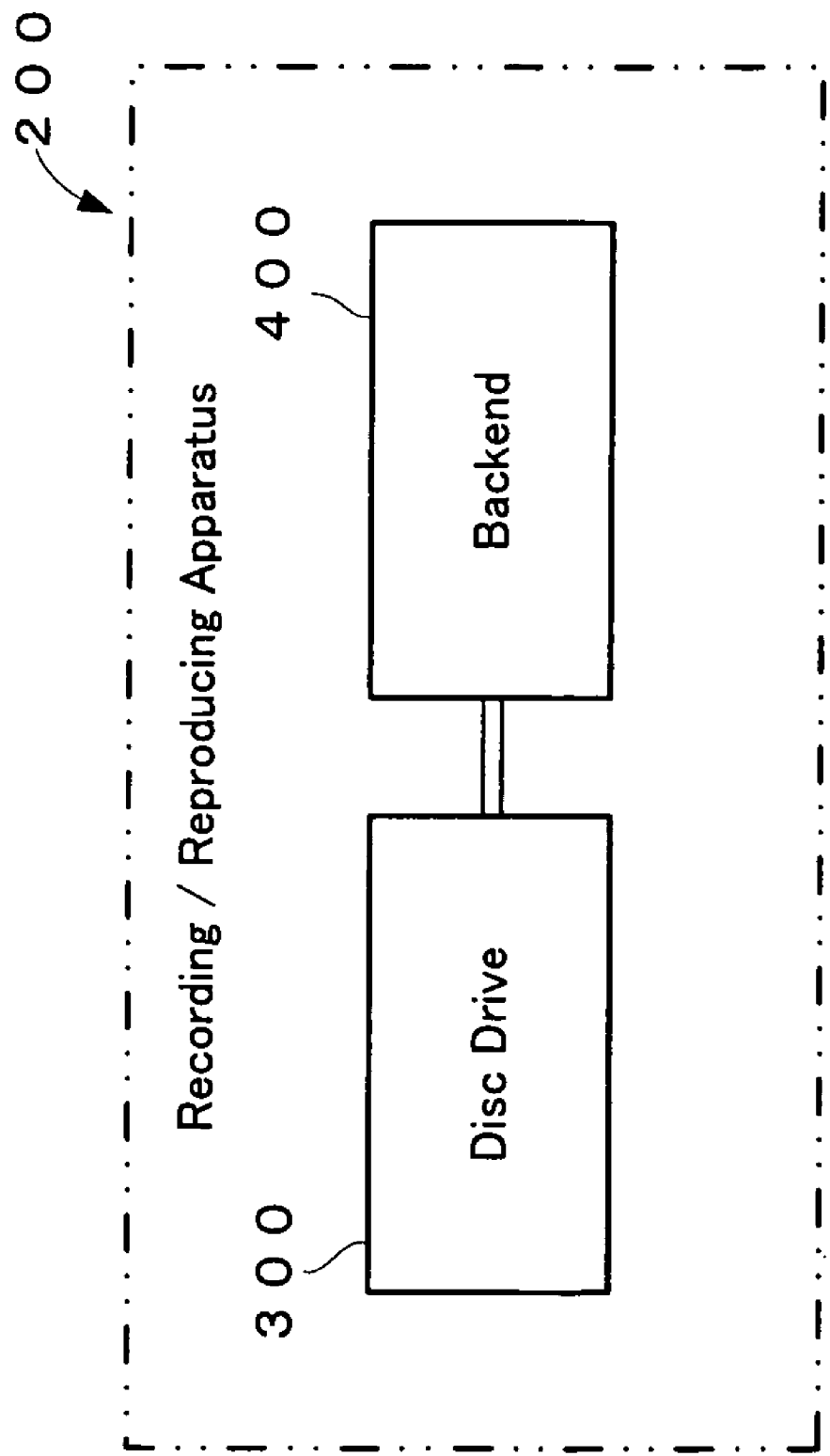
FIG. 6 is a block diagram showing a recording/reproducing apparatus, which is an embodiment of a recording apparatus and a reproducing apparatus of the present invention.
Figure 7:
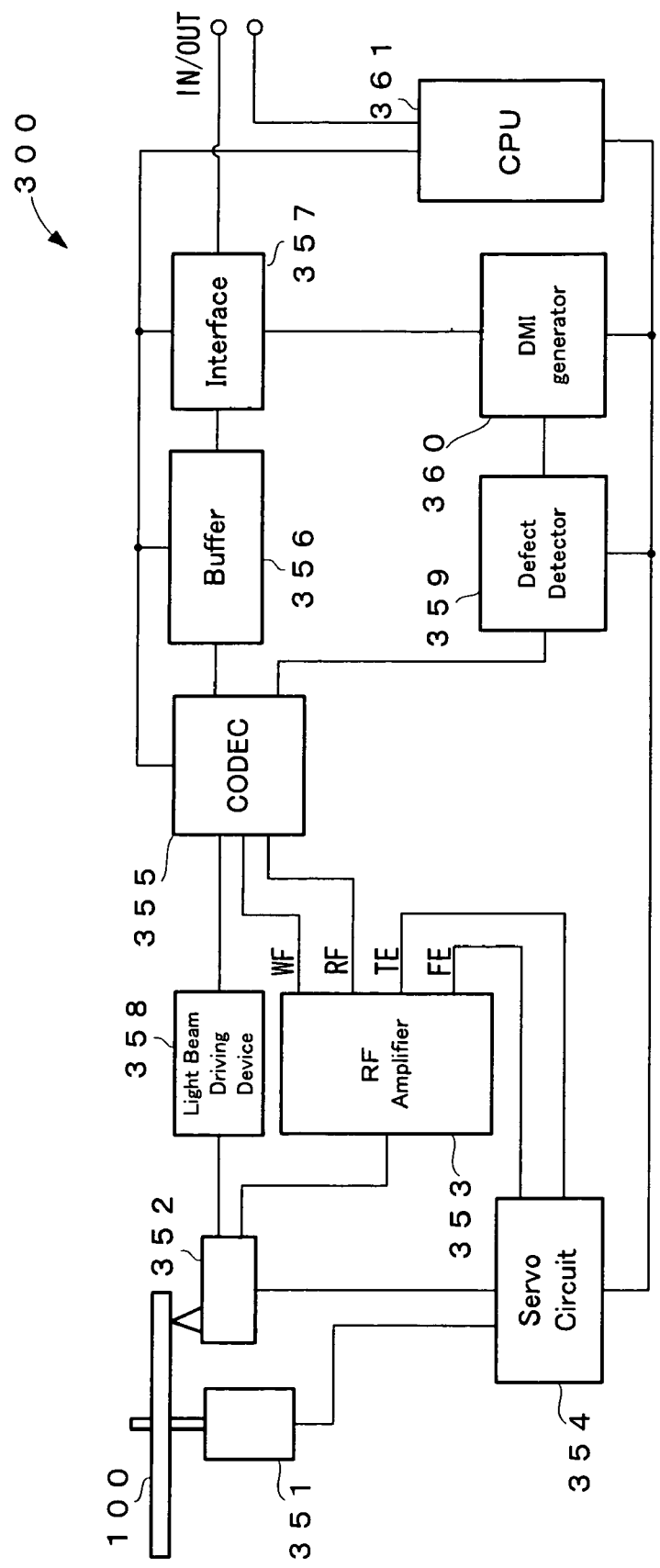
FIG. 7 is a block diagram showing a disc drive of the recording/reproducing apparatus in the embodiment.
Figure 8:
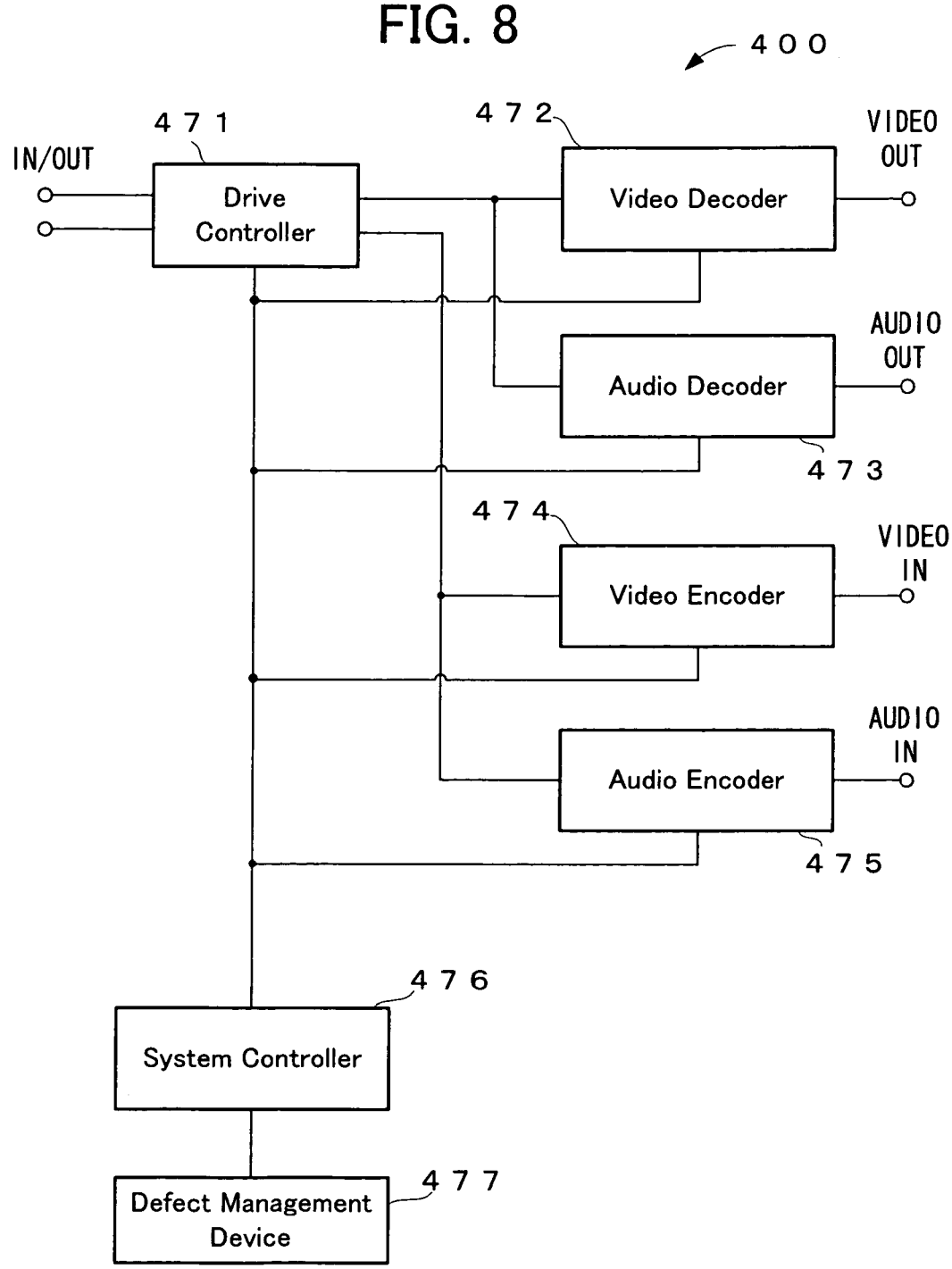
FIG. 8 is a block diagram showing a backend of the recording/reproducing apparatus in the embodiment.

Next, the structure of the recording/reproducing apparatus in the embodiment of the present invention will be discussed with reference to FIG. 6 to FIG. 8. FIG. 6 is a block diagram showing the basic structure of a recording/reproducing apparatus 200, which is an embodiment of the present invention. FIG. 7 is a block diagram showing a disc drive of the recording/reproducing apparatus. FIG. 8 is a block diagram showing a backend of the recording/reproducing apparatus. The recording/reproducing apparatus 200 has a function of recording the record data onto the optical disc 100 and a function of reproducing the record data recorded on the optical disc 100.

As shown in FIG. 6, the recording/reproducing apparatus 200 is provided with: a disc drive 300; and a backend 406.

FIG. 7 shows the inner structure of the disc drive 300. The disc drive 300 is an apparatus for recording information onto the optical disc 100 and reading the information recorded on the optical disc 100.

As shown in FIG. 7, the disc drive 300 is provided with: a spindle motor 351; an optical pickup 352; a Radio Frequency (RF) amplifier 353; and a servo circuit 354.

The spindle motor 351 is a motor for rotating the optical disc 100.

The optical pickup 352 records the record data or the like onto the recording surface of the optical disc 100 by irradiating the recording surface with a light beam, and reads the record data or the like recorded on the recording surface by receiving reflected light of the light beam. The optical pickup 352 outputs a RF signal corresponding to the reflected light of the light beam.

The RF amplifier 353 amplifies the RF signal outputted from the optical pickup 352 and outputs it to a Coder/Decoder (CODEC) 355. Moreover, the RF amplifier 353 generates, from the RF signal, a wobble frequency signal WF, a track error signal TE, and a focus error signal FE, and outputs them.

The servo circuit 354 is a servo control circuit for controlling the driving of the optical pickup 352 and the spindle motor 351 on the basis of the track error signal TE, the focus error signal FE, and other servo control signals.

Moreover, as shown in FIG. 7, the disc drive 300 is provided with: the CODEC 355; a buffer 356; an interface 357; and a light beam driving device 358.

The CODEC 355 is a circuit, provided with: a function of performing an error correction for the record data upon reading; and a function of appending an error correction code or mark to the record data upon recording and modulating the record data. Specifically, upon reading, the CODEC 355 demodulates and decodes the RF signal outputted from the RF amplifier 353, performs an error correction for the decoded RF signal, and then outputs this to the buffer 356. Moreover, if the error correction is impossible as a result of performing the error correction for the decoded RF signal or if the number of error-corrected codes exceeds a certain reference value, the CODEC 355 generates an error-correction-impossible signal for indicating that, and outputs this signal to a defect detector 359. Upon recording, the CODEC 355 appends the error correction code to the record data outputted from the buffer 356, modulates this data to have a code suited to the optical characteristics or the like of the optical disc 100, and then outputs the modulated record data to the light beam driving device 358.

The buffer 356 is a memory circuit for storing the record data temporarily.

The interface 357 is a circuit for controlling the input/output or communication of the record data or the like between the disc drive 300 and the backend 400. Specifically, upon reproducing, the interface 357 responds a request command from the backend 400, and outputs the record data outputted from the buffer 356 (i.e. the record data read from the optical disc 100) to the backend 400. Upon recording, the interface 357 receives the record data which is inputted from the backend 400 to the disc drive 300, and outputs this data to the buffer 356. The interface 357 responds the request command from the backend 400 and outputs all or part of the defect lists maintained in a generator 360 for generating Defect Management Information (DMI generator 360) to the backend 400.

Upon recording, the light beam driving device 358 generates a light beam driving signal corresponding to the record data outputted from the CODEC 355 and outputs this signal to the optical pickup 352. The optical pickup 352 modulates a light beam on the basis of the light beam driving signal, and irradiates the recording surface of the optical disc 100 with it. This causes the recording of the record data or the like onto the recording surface.

Moreover, as shown in FIG. 7, the disc drive 300 is provided with: the defect detector 359; and the DMI generator 360.

The defect detector 359 is a circuit for detecting a defect on the optical disc 100. The defect detector 359 generates a defect detection signal for indicating the presence or absence of a defect, and outputs this signal. The defect detector 359 detects a defect on the basis of the result of the error correction of the record data upon reading information (upon verifying or reproducing). As described above, if the error correction is impossible as a result of performing the error correction for the decoded RF signal or if the number of error-corrected codes exceeds a certain reference value, the CODEC 355 generates the error correction impossible signal for indicating the fact, and outputs this signal to the defect detector 359. The defect detector 359 outputs the defect detection signal for indicating the presence of a defect when receiving this error correction impossible signal.

The DMI generator 360 is a circuit for generating or updating the defect management information 120 on the basis of the defect detection signal outputted from the defect detector 359. The defect management information 120 is rewritably stored into a memory circuit located in the DMI generator 360. The DMI generator 360 responds to the request command from the backend 400 and outputs the defect management information 120 to the backend 400 through the interface 357.

Moreover, as shown in FIG. 7, the disc drive 300 has a Central Processing Unit (CPU) 361. The CPU 361 controls the disc drive 300 as a whole, and controls the exchange of information among the elements in the disc drive 300 described above. The CPU 361 also controls the recording operation and reading operation of the record data and the defect management information 120. The CPU 361 also responds to the control command or the request command transmitted from the backend 400, and controls the exchange of data between the disc drive 300 and the backend 400.

Next, FIG. 8 shows the inner structure of the backend 400. The backend 400 is an apparatus for performing a reproduction process with respect to the record data read by the disc drive 300 from the optical disc 100, receiving the record data supplied from the outside in order to record it onto the optical disc 100, encoding this record data, and transmitting it to the disc drive 300.

The backend 400 is provided with: a drive controller 471; a video decoder 472; an audio decoder 473; a video encoder 474; an audio encoder 475; a system controller 476; and a defect management device 477.

The drive controller 471 is a circuit for controlling the reading process and recording process of the disc drive 300. The backend 400 and the disc drive 300 cooperate and perform an operation of reading the record data from the optical disc 100 and reproducing it and an operation of receiving the record data from the outside and recording it onto the optical disc 100. The drive controller 471 realizes the cooperation of the backend 400 and the disc drive 300 by controlling the reading process and recording process of the disc drive 300. Specifically, the drive controller 471 outputs to the disc drive 300 request commands about reading, recording, outputting the record data from the buffer 356, outputting the defect management information 120 from the DMI generator 360, and so on. The drive controller 471 also controls the input and output of the record data, the defect management information 120, and other various information.

The video decoder 472 and the audio decoder 473 are circuits for decoding the record data which is read from the optical disc 100 by the disc drive 300 and which is supplied through the drive controller 471, and converting the record data to be reproducible with a display, a speaker, or the like.

The video encoder 474 and the audio encoder 475 are circuit for receiving a video signal, an audio signal, or the like, inputted from the outside for the purpose of recording them on the optical disc 100, compressing and encoding them by Moving Picture Experts Group (MPEG) compressing and encoding method or the like, and supplying them to the disc drive 300 through the drive controller 471.

The system controller 476 is a circuit for controlling: the drive controller 471; the video decoder 472; the audio decoder 473; and the defect management device 477, and performing the reproduction process of the record data in cooperation with the devices, upon reproducing. Upon recording, the system controller 476 controls: the drive controller 471; the video encoder 474; the audio encoder 475; and the defect management device 477, to thereby record the record data in cooperation with the devices. Upon reproducing and recording, the system controller 476 controls the disc drive 300 (e.g. controls the generation and transmission of various request commands, the reception of a response signal, or the like) with the drive controller 471 in order to realize the cooperation of the disc drive 300 and the backend 400.

The defect management device 477 has therein a memory circuit, and has a function of receiving and maintaining all or part of the defect management information 120 generated or updated by the DMI generator 360 in the disc drive 300. The defect management device 477 performs the defect management with the system controller 476.

Figure 9:
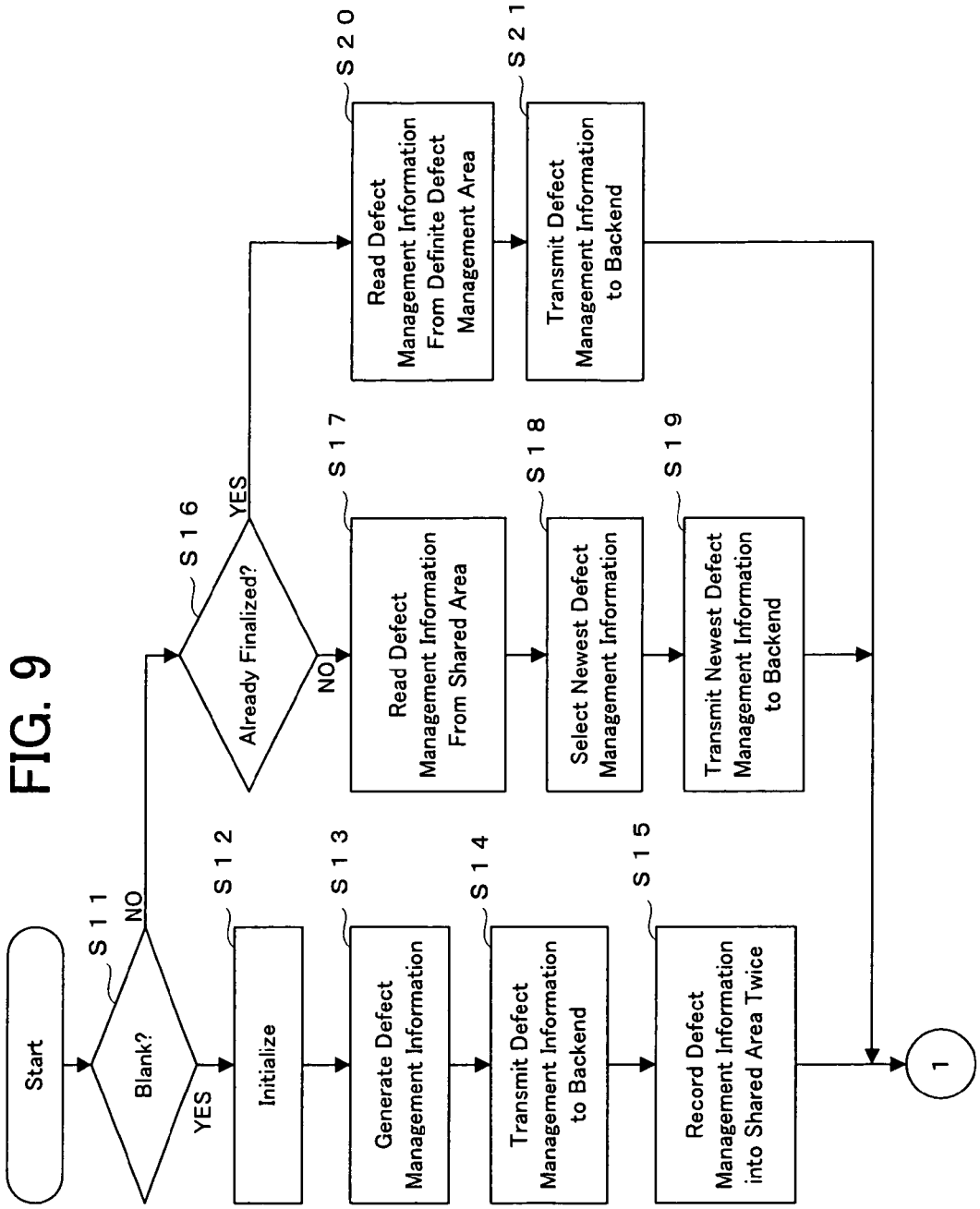
FIG. 9 is a flowchart showing the initial setting operation of the recording/reproducing apparatus in the embodiment.

Next, the initial setting operation of the recording/reproducing apparatus 200 will be explained. FIG. 9 shows the initial setting operation of the recording/reproducing apparatus 200. The recording/reproducing apparatus 200 performs the initial setting between (i) when the optical disc 100 is inserted or loaded in the drive unit 300 and (ii) when the record data is recorded or reproduced. The initial setting is a process for preparing for the recording or the reproduction of the record data, and includes various processes. Out of the various processes, the initialization of the optical disc 100, the generation of the defect management information 120, the transmission of the defect management information 120 to the backend 400, or the like will be explained below. The process is performed mainly under the control of the CPU 361 of the drive unit 300.

As shown in FIG. 9, when the optical disc 100 is inserted or loaded into the drive unit 300, the CPU 361 of the drive unit 300 judges whether or not the optical disc 100 is an unrecorded disc (i.e. a blank disc) (step S11).

If the optical disc 100 is a blank disc (the step S11: YES), the CPU 361 initializes the optical disc 100 (step S12). In this initialization, the DMI generator 360 generates the defect management information 120 (step S13). Specifically, it obtains the start address and end address of the user data area 108 and the areal sizes of the shared areas 104 and 105, which are set in the initialization, and generates the setting information 121. Moreover, it also generates the defect list 122. The defect list 122 generated at this time has only an outline or frame, not having any content. Namely, the defect address is not recorded in it, nor is the specific spare address. A header, identification or discrimination information, or the like are only recorded. The generated defect management information 120 is stored and maintained in the DMI generator 360.

Then, the CPU 361 transmits the defect management information 120 stored in the DMI generator 360, to the backend 400 (step S14). The defect management information 120 is stored into the defect management device 477 of the backend 400.

Then, the CPU 361 records the defect management information 120 stored in the DMI generator 360, into the shared area 104 or 105 on the optical disc 100, repeatedly, twice (step S15).

On the other hand, if the optical disc 100 is not a blank disc (the step S11: NO), then, the CPU 361 judges whether or not the optical disc 100 is already finalized (step S16). The finalizing is a process for arranging (or organizing) a recording format of the optical disc 100, to reproduce the record data on the optical disc 100 by using a reproducing apparatus for a general rewritable-type optical disc and a reproducing apparatus for a general reproduce-only-type optical disc. It is possible to know whether of not the optical disc 100 is already finalized, with reference to the control information recorded in the lead-in area 101 or the like on the optical disc 100.

If the optical disc 100 is not finalized (the step S16: NO), the CPU 361 reads the defect management information 120 from the shared area 104 or 105 on the optical disc 100 (step S17). Namely, if the optical disc 100 is not a blank disc, the defect management information 120 which are already generated in the past are recorded in the shared area 104 or 105, so that this is read in this step.

If a plurality of defect management information 120 is recorded in the shared area 104 or 105, the CPU 361 selects and reads the newest defect management information from among them (step S18). In other words, before the finalizing, the defect management information 120 is recorded into the shared area 104 or 105 every time the defect management information 120 is updated. The plurality of defect management information 120 is arranged, continuously, in the updated order. Therefore, the defect management information located in the end in the shared area 104 or 105 is the newest defect management information. The CPU 361 selects and reads the defect management information located in the end.

The embodiment adopts the following manner in order to specify the defect management information 120 located in the end. Namely, the plurality of defect management information 120 and evacuation data are recorded in the shared area 104 or 105. Then, the defect management information 120 or the evacuation data are recorded from the inner or the outer circumferential side, respectively, so that it is possible to distinguish each data (information) in practice. Therefore, in this case, information is recorded from the start address of the shared area 104 or 105 to the end address of the area where the last defect management information 120 is recorded, and it is unrecorded after the end address, and the evacuation data is recorded following the unrecorded area. The CPU 361 controls the optical pickup 352 to scan the shared area 104 or 105 from the start address thereof, to thereby detect a position at which it becomes the unrecorded state, and to scan the shared area 104 or 105 from the position in the opposite direction. In this manner, the last defect management information 120 is specified. According to this method, it is possible to simply specify the last defect management information 120 without a pointer or the like.

Then, the CPU 361 stores the read last defect management information 120 into the DMI generator 360 and transmits this information to the backend 400 (step S19). The last defect management information 120 is stored in the defect management device 477 of the backend 400.

On the other hand, if the optical disc 100 is not a blank disc but is already finalized (the step S16: YES), the CPU 361 reads the defect management information 120 from the definite defect management area 106 or 107 (step S20), and transmits this information to the backend 400 (step S21). The defect management information 120 is stored into the defect management device 477 of the backend 400.

In the above manner, the defect management information 120 is generated, or the defect management information 120 is selectively read from the shared area 104 or 105, or the defect management information 120 is selectively read from the definite defect management area 106 or 107. Then, the defect management information 120 is stored into the DMI generator 360 and the defect management device 477 of the backend 400. By this, the defect management is prepared, to thereby end the initial setting.

Figure 10:
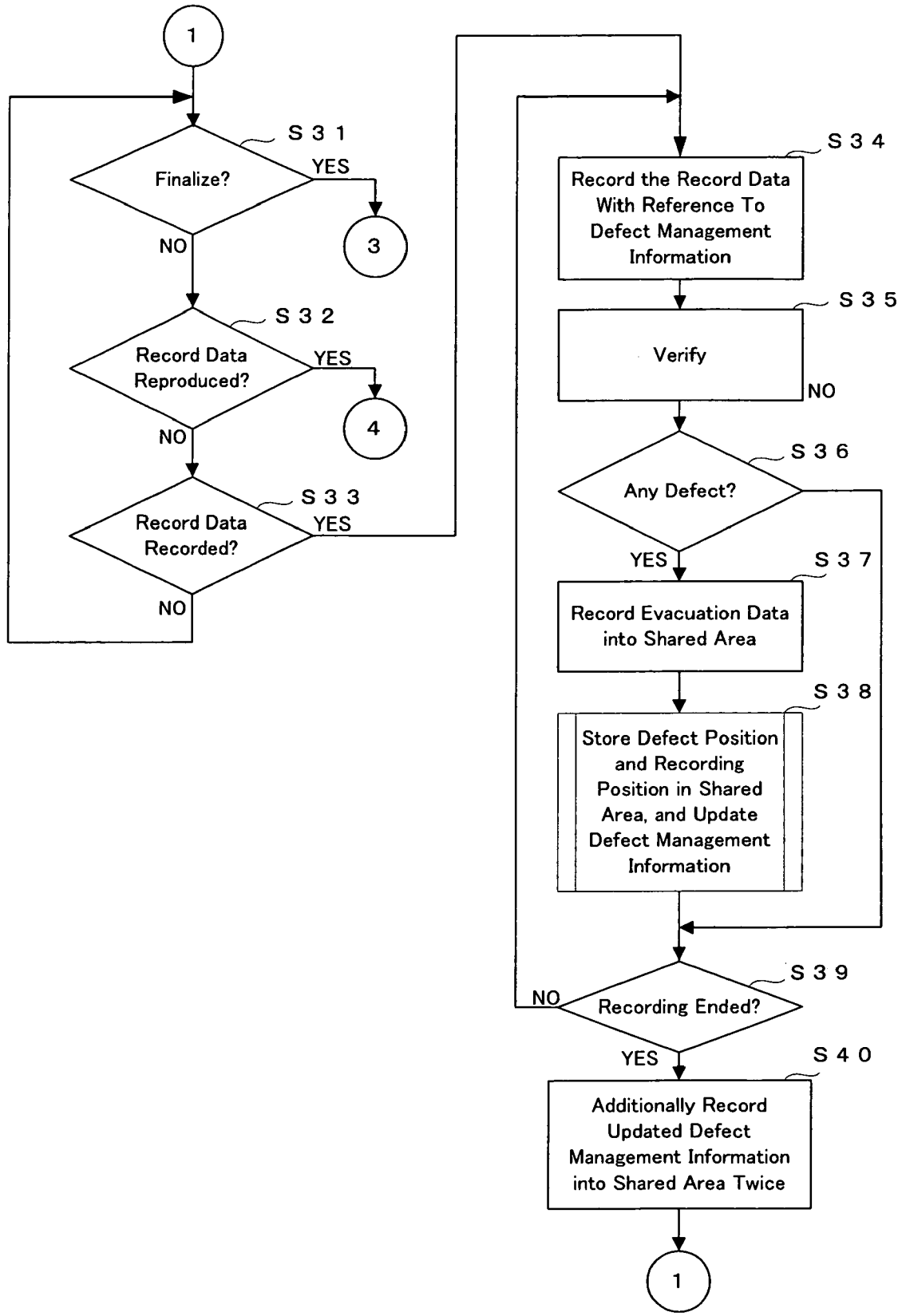
FIG. 10 is a flowchart showing the recording operation and the like of the recording/reproducing apparatus in the embodiment.

Next, the recording operation of the recording/reproducing apparatus 200 will be explained. FIG. 10 mainly shows the recording operation of the recording/reproducing apparatus 200. The recording/reproducing apparatus 200 performs the recording operation of recording the record data into the user data area 108 on the optical disc 100. The recording/reproducing apparatus 200 also performs verifying during the recording operation, and updates the defect list 122 on the basis of the result of the verifying. The recording operation is realized by the cooperation of the CPU 361 of the disc drive 300 and the system controller 476 of the backend 400.

As shown in FIG. 10, if a user inputs an instruction to start recording (step S33: YES), the recording/reproducing apparatus 200 responds to this and records the record data (step S34). The record data is recorded into each predetermined block. The recording/reproducing apparatus 200 refers to the defect management information 120 stored in the defect management device 477 of the backend 400, and records the record data while performing the defect management on the basis of this information.

The recording/reproducing apparatus 200 performs verifying at each time of the one block recording (step S35), and updates the defect management information 120 on the basis of the result of the verifying. The defect management information 120 to be updated is the defect management information 120 stored in the DMI generator 360. Specifically, if it is recognized, as a result of the verifying, that the record data fails to be recorded (step S36: YES), the CPU 361 records the record data that fails to be recorded, into the shared area 104 or 105 from the outer circumferential side thereof (step S37). Then, the CPU 361 estimates that there is a defect in a place in which the record data is supposed to be recorded, and records the defect address for indicating the place and the corresponding spare address onto the defect list 122 (step S38).

When the processes in the above-described steps S34 to S38 ends with respect to a series of blocks of the record data to be recorded this time, the CPU 361 records the updated defect management information 120 into the shared area 104 or 105 from the inner circumferential side thereof on the optical disc 100, repeatedly twice, after the record data recorded in the step S37 (i.e. the evacuation data) (step S41). Therefore, in the shared area 104 or 105, the evacuation data is recorded from the outer circumferential side, and the defect management information 120 is recorded from the inner circumferential side, as shown in FIG. 4.

Incidentally, the defect management information 120 to be recorded into the shared area 104 or 105 is the defect management information stored in the DMI generator 360. Then, the recording operation is completed.

Now, with reference to FIGS. 11, an aspect on the optical disc 100 in the recording operation will be discussed. FIGS. 11 are schematic diagrams conceptually showing the state of data on the recording medium in the recording operation of the recording/reproducing apparatus in the embodiment.

Figure 11A:
FIGS. 11 are schematic diagrams conceptually showing the state of data on the recording medium in the recording operation of the recording/reproducing apparatus in the embodiment.

As shown in FIG. 11(a), at a time point before the recording, predetermined record data is recorded into the user data area 108 which has no record data.

Figure 11B:

Now, it is assumed that there is a defect in the user data area 108. In other words, as shown in FIG. 11(b), it is assumed that there is a defect area 108d in the user data area 108.

Figure 11C:
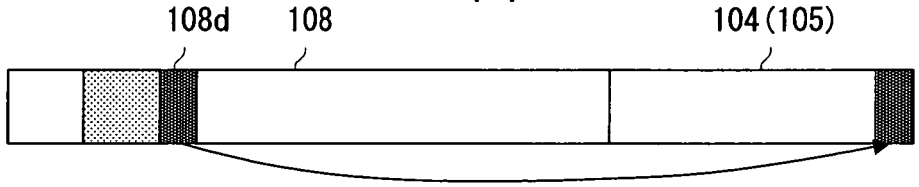

In this case, as shown in FIG. 11(c), the record data to be recorded into the defect area 108d (i.e. the evacuation data) is recorded into a predetermined area in the shared area 104 or 105, for example, from the outer circumferential side, in order.

Incidentally, such an operation is performed, not limited to during the recording operation, but the operation is also performed if the presence of a defect is recognized during the reproduction of the record data recorded in the user data area.

Figure 11D:
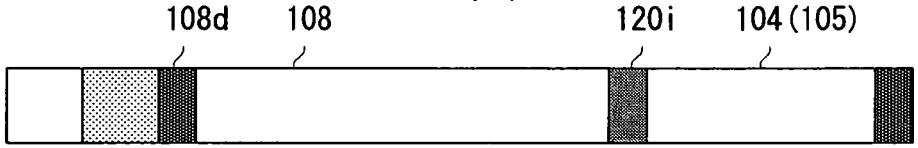

Then, as shown in FIG. 11(d), defect management information 120i which indicates the address of the defect area 108d or the like is recorded into the shared area 104. The defect management information 120i is recorded following the evacuation data recorded in the shared area 104 or 105, for example, from the inner circumferential side, in order.

Figure 11E:

Then, such an operation is continued, to thereby record the desired record data into the user data area 108, as shown in FIG. 11(e).

As described above, by recording the defect management information 120 and the evacuation data into the shared area 104 or 105, even if the data capacity of the defect management information 120 is too large and the recording capacity of the evacuation data is too large, it is possible to record the defect management information 120 and the evacuation data as long as there is a space area in the shared area 104 or 105. Therefore, it is possible to use the recording capacity of the shared area 104 or 105 (or the optical disc 100), efficiently and to the greatest extent, to thereby record the record data.

Figure 11F:

Then, in the embodiment, as shown in FIG. 11(f), it is possible to judge that there is no space area in the shared area 104 or 105, at a time point that an area occupied by the defect management information 120 which is recorded from the inner circumferential side and an area occupied by the evacuation data which is recorded form the outer circumferential side run into each other, in the shared area 104 or 105.

Incidentally, even if the defect management information 120 and the evacuation data are not recorded from the inner circumferential side or the outer circumferential side, respectively, if recorded into an area which can be distinguished in the shared area 104 or 105, this is also included in the scope of the present invention.

Moreover, in the case of the optical disc having a plurality of shared areas, the defect management information 120 and the evacuation data may be recorded from the outer circumferential side or the inner circumferential side, respectively, in at least one of the shared areas, as described above. Even by this, it is possible to use the recording capacity of the shared area, efficiently and to the greatest extent, to thereby record the record data, as described above.

Specifically, one shared area group including at least one shared area may be allocated to record the defect management information 120, and another shared area group including at least one shared area may be allocated to record the evacuation data. Then, if one shared area which is not included in these shared area groups is constructed to record therein the defect management information 120 and the evacuation data from the inner and outer circumferential side, respectively, it is possible to receive the various benefits owned by the information recording/reproducing apparatus 200 as described above. As described above, the shared area where the defect management information and the evacuation data are recorded with them mixed may be one shared area, or another shared area selected from the plurality of shared areas.

Moreover, in the case of the optical disc having the plurality of shared areas as described above, the defect management information 120 and the evacuation data may be recorded into one shared area, and if the recording is completed until the limit of the recording capacity of the one shared area, another shared area may be newly selected, to thereby record therein the defect management information 120 and the evacuation data. In other words, by completing the recording sequentially one by one in the plurality of shared areas, it is possible to keep the operation amount of the pickup under control, which is related to the recording operation of the defect management information 120 and the evacuation data. In other words, it is possible to realize the speed-up of the recording operation, the reduction of power consumption, or the like. Even if these data is arbitrarily recorded into each of the plurality of shared areas, it is possible to record the record data while performing the defect management by using the recording capacity of the shared area, efficiently and to the greatest extent.

Figure 12:
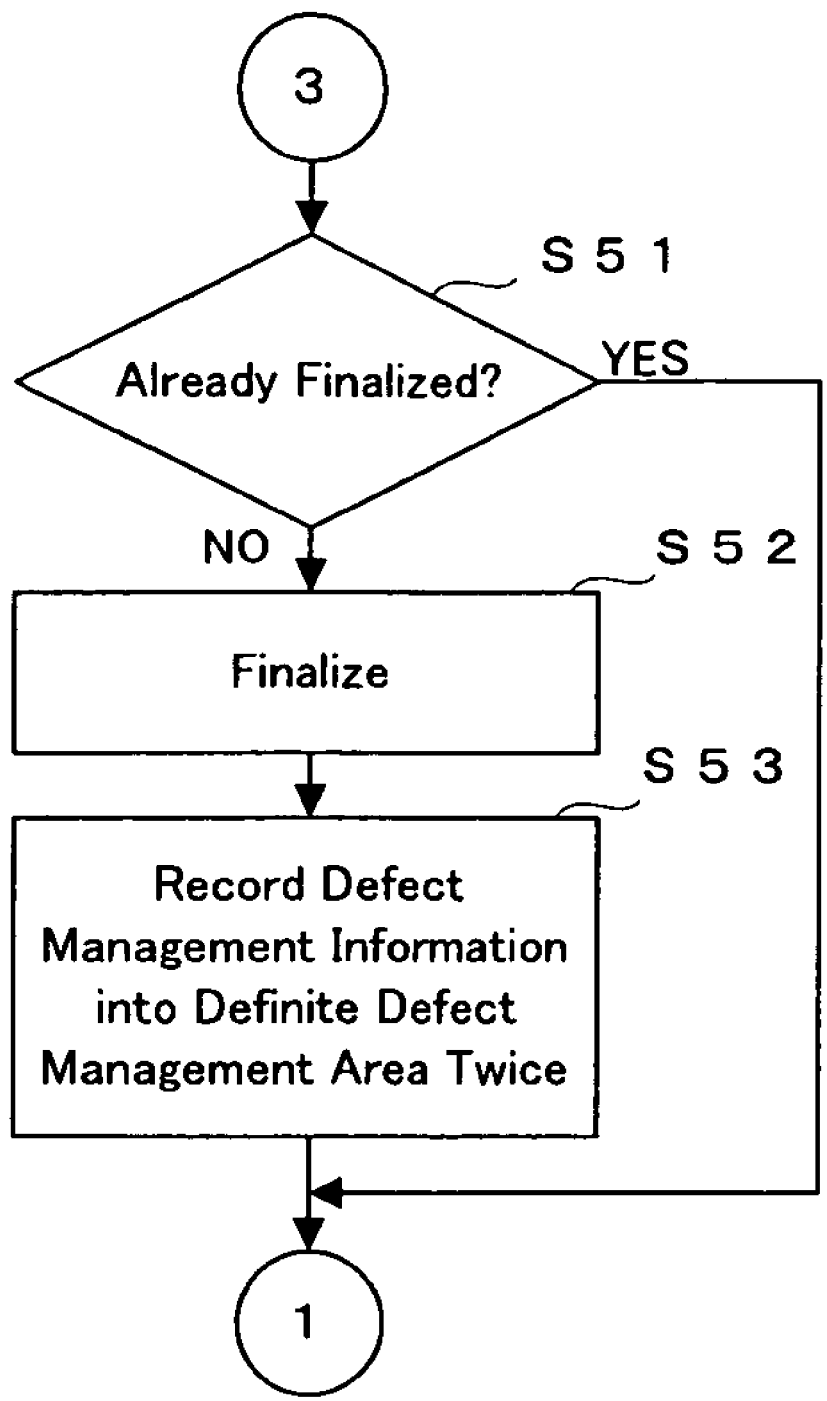
FIG. 12 is a flowchart showing the finalize process of the recording/reproducing apparatus in the embodiment.

Next, the finalize process of the recording/reproducing apparatus 200 will be explained. FIG. 12 shows the finalize process. For example, if the user inputs an instruction for indicating to finalize (the step S31 in FIG. 10: YES), the recording/reproducing apparatus 200 confirms that the optical disc 100 is not finalized yet (step S51: YES) and finalizes the optical disc 100 (step S52). Upon finalizing, the recording/reproducing apparatus 200 records the defect management information 120 into the definite defect management area 106 or 107 on the optical disc 100, repeatedly twice (step S53). Incidentally, the defect management information 120 to be recorded into the definite defect management area 106 or 107 is the defect management information 120 stored in the DMI generator 360. Incidentally, in this example, the number of the defect management information 120 recorded in the definite defect management area 106 or 107 is two; however, it may be three or more, or may be one. Then, the finalizing is completed.

Figure 13:
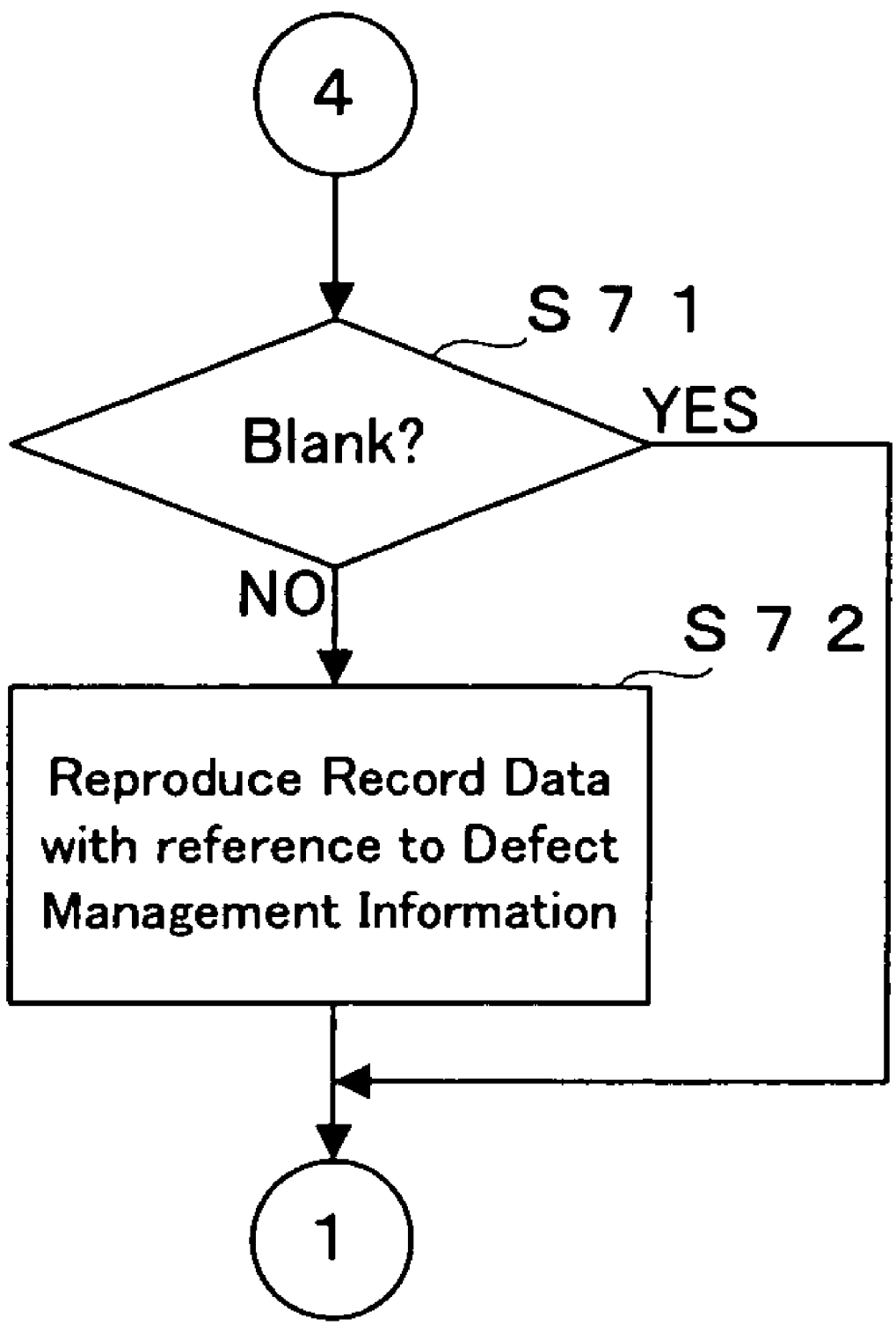
FIG. 13 is a flowchart showing the reproduction operation of the recording/reproducing apparatus in the embodiment.

Next, the reproduction operation of the recording/reproducing apparatus 200 will be explained. FIG. 13 shows the reproduction operation of the recording/reproducing apparatus 200.

If a user inputs an instruction to start recording (step S33: YES), the recording/reproducing apparatus 200 confirms that the optical disc 100 is not a blank disc (the step S71: NO), and reproduces the record data recorded in the user data area 108 on the optical disc 100 (step S72). The recording/reproducing apparatus 200 reproduces the record data, while performing the defect management on the basis of the defect management information 120 stored in the defect management device 477 of the backend 400.

Consequently, according to the recording/reproducing apparatus 200 in the embodiment, before finalizing the optical disc 100, the defect management information 120 is recorded into the shared area 104 or 105 of the optical disc 100. Upon finalizing the optical disc 100, the defect management information 120 is recorded into the definite defect management area 106 or 107 of the optical disc 100. On the other hand, with respect to the optical disc 100 which is not finalized, the defect management information 120 is read from the shared area 104 or 105 of the optical disc 100. With respect to the optical disc 100 which is already finalized, the defect management information 120 is read from the definite defect management area 106 or 107 of the optical disc 100. By this, with respect to the optical disc 100 which is not finalized and the optical disc 100 which is already finalized, it is possible to realize the recording or reproduction of the record data while performing the defect management properly.

In particular, it is possible to use the recording capacity of the shared area 104 or 105 to the greatest extent, to thereby record the record data, by recording the defect management information 120 and the evacuation data into the shared area 104 or 105 from the inner or outer circumferential side, respectively.

Moreover, according to the recording/reproducing apparatus 200 in the embodiment, it records the defect management information 120 into the definite defect management area 106 or 107 of the optical disc 100 in the finalize process. Thus, it is possible to establish the compatibility between the write-once-type optical disc 100 and the general rewritable type optical disc.

Figure 14:
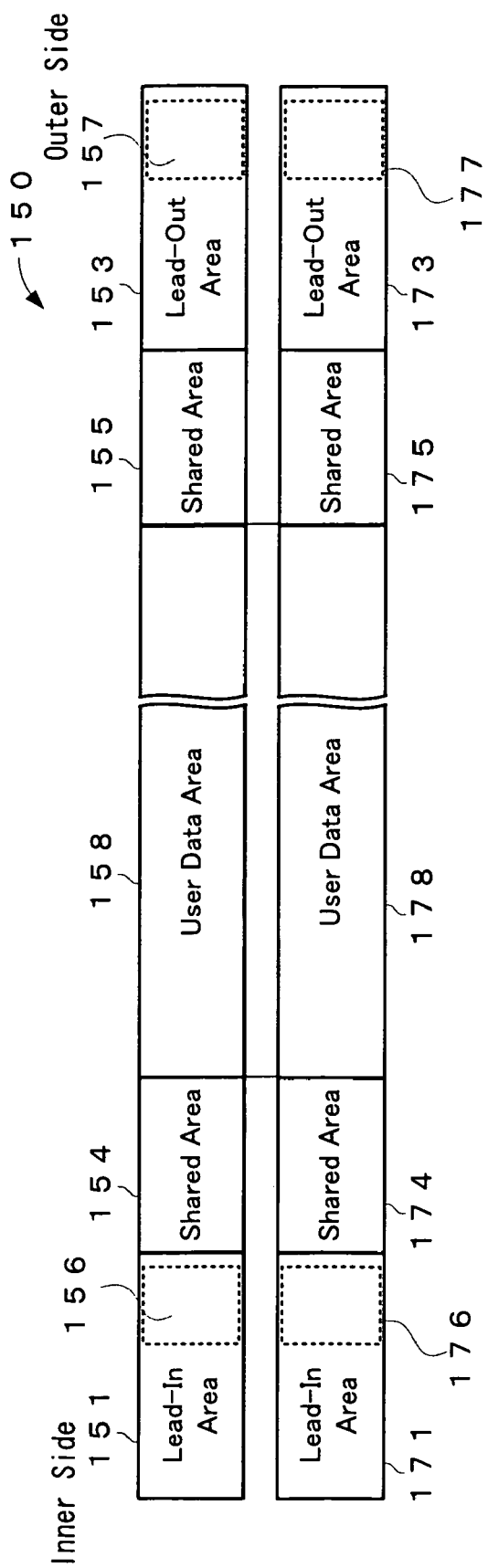
FIG. 14 is an explanatory diagram showing another embodiment of the write-once-type recording medium of the present invention.

Incidentally, in the above-mentioned embodiments, such an example is given that the write-once-type recording medium of the present invention is applied to the optical disc with one layer. The present invention, however, is not limited to this example, and can be applied to an optical disc with two or more layers. FIG. 14 shows another embodiment in which the write-once-type recording medium of the present invention is applied to an optical disc with two layers. Incidentally, in the embodiment shows a parallel track path in which the recording directions are the same in the first layer and the second layer; however, it may adopt an opposite track path in which the recording directions are opposite in the first layer and the second layer.

The first layer of a two-layer optical disc 150 in FIG. 14 (upper part in FIG. 14) is provided with: a lead-in area 151; a user data area 158; and a lead-out area 153, as in the optical disc 100, and is provided with: a shared area 154 between the lead-in area 151 and the user data area 158; and a shared area 155 between the user data area 158 and the lead-out area 153. Moreover, it is provided with definite management areas 156 and 157 in the lead-in area 151 and in the lead-out area 153, respectively. The second layer is provided with: a lead-in area 171; a user data area 178; and a lead-out area 173, as in the optical disc 100, and is provided with: a shared area 174 between the lead-in area 171 and the user data area 178; and a shared area 175 between the user data area 178 and the lead-out area 173. Moreover, it is provided with definite management areas 176 and 177 in the lead-in area 171 and in the lead-out area 173, respectively.

Incidentally, the drawings used for the explanation of the embodiments of the present invention embody constitutional elements or the like of the recording medium, the recording apparatus, and the reproducing apparatus of the present invention only for the purpose of explaining technical ideas thereof. The shape, size, position, connection relationship, and the like of various constitutional elements or the like are not limited to the drawings.

In addition, in the above-mentioned embodiments, the optical disc 100 is discussed as one example of the recording medium, and the recorder or player related to the optical disc 100 is discussed as one example of the recording/reproducing apparatus. Nevertheless, the present invention is not limited to the optical disc and the recorder or player thereof, but is applicable to other various write-once-type recording media and the recorders thereof which support high density recording or a high transfer rate.

The present invention can be changed if desired without departing from the scope or spirit of the invention which can be read from the claims and the entire specification. A write-once-type recording medium, a recording apparatus, a reproducing apparatus, a recording method, a reproducing method, and a computer program that realizes these functions, which accompany such changes, are also intended to be within the technical scope of the present invention.

INDUSTRIAL APPLICABILITY

A write-once-type recording medium, a recording apparatus and a recording method for the write-once-type recording medium, a reproducing apparatus and a reproducing method for the write-once-type recording medium, a computer program for recording or reproduction control, and a data structure of the present invention can be applied to a high-density optical disc, magnetic disc, magneto optical disc, and the like, for consumer or industrial use, on which various information can be recorded at high density, and further can be applied to a recorder and a player and the like related to the optical disc. Moreover, they can be applied to a write-once-type recording medium, a recording or reproducing apparatus, or the like, which are mounted on or can be connected to various computer equipment, for example.

The invention claimed is:

1. A write-once-type recording medium comprising:
   a data area to record therein the record data;
   a control information recording area, which includes a definite defect management area to record therein defect management information of said data area, to record therein information for controlling at least one of operations of recording and reading in said data area; and
   a shared area, which is disposed between said control information recording area and said data area, to record therein evacuation data which is record data to be recorded at a position of a defect in said data area and to temporarily record therein to temporarily record therein the defect management information of said data area, the evacuation data being recorded with one predetermined point which exists in said shared area as a start point, the defect management information being recorded with another predetermined point which exists at a different point from the one point as a start point, in said shared area,
   wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area,
   in the shared area, the evacuation data is separately recorded from the defect management information,
   an area portion in the shared area, into which the evacuation data is recorded, is outer than an area portion in the shared area, into which the defect management information is recorded.

2. The write-once-type recording medium according to claim 1, wherein the evacuation data is continuously recorded with the one point as the start point and the defect management information is continuously recorded with the another point as the point, in said shared area.

3. The write-once-type recording medium according to claim 1, wherein the evacuation data and the defect management information are each recorded, repeatedly, a plurality of times, in said shared area.

4. A recording apparatus for re-cording record data onto a write-once-type recording medium comprising:
   (i) a data area to record therein the record data;
   (ii) a control information recording area, which includes a definite defect management area, to record therein defect management information of said data area to record therein information for controlling at least one of operations of recording and reading in said data area; and
   (iii) a shared area, which is disposed between said control information recording area and said data area, to record therein evacuation data which is record data to be recorded at a position of a defect in said data area and to temporarily record therein the defect management information of said data area, wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area,
   said recording apparatus comprising:
   a first recording device for recording the record data into said data area; and
   a second recording device for recording the evacuation data and the defect management information into said shared area, said second recording device recording the evacuation data with one predetermined point which exists in said shared area as a start point, said second recording device recording the defect management information with another predetermined point which exists at a different point from the one point as a start point, in said shared area,
   said second recording device recording the evacuation data and the defect management information in such a manner that, in the shared area, the evacuation data is separately recorded from the defect management information,
   said second recording device recording the evacuation data and the defect management information in such a manner that an area portion in the shared area, into which the evacuation data is recorded, is outer than an area portion in the shared area, into which the defect management information is recorded.

5. A recording method of recording record data onto a write-once-type recording medium comprising:
   (i) a data area to record therein the record data;
   (ii) a control information recording area, which includes a definite defect management area to record therein defect management information of said data area, to record therein information for controlling at least one of operations of recording and reading in said data area; and
   (iii) a shared area, which is disposed between said control information recording area and said data area, to record therein evacuation data which is record data to be recorded at a position of a defect in said data area and to temporarily record therein the defect management information of said data area, wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area,
   said recording method comprising:
   a first recording process of recording the record data into said data area; and
   a second recording process of recording the evacuation data and the defect management information into said shared area, said second recording process recording the evacuation data with one predetermined point which exists in said shared area as a start point, said second recording process recording the defect management information with another predetermined point which exists at a different point from the one point as a start point, in said shared area,
   said second recording process recording the evacuation data and the defect management information in such a manner that, in the shared area, the evacuation data is separately recorded from the defect management information,
   said second recording process recording the evacuation data and the defect management information in such a manner that an area portion in the shared area, into which the evacuation data is recorded, is outer than an area portion in the shared area, into which the defect management information is recorded.

6. A reproducing apparatus for reproducing the record data recorded on a write-once-type re-cording medium comprising:
   (i) a data area to record therein the record data;
   (ii) a control information recording area, which includes a definite defect management area to record therein defect management information of said data area to record therein information for controlling at least one of operations of recording and reading in said data area; and
   (iii) a shared area which is disposed between said control information recording area and said data area, to record therein evacuation data which is record data to be recorded at a position of a defect in said data area and to temporarily record therein the defect management information of said data area, the evacuation data being recorded with one predetermined point which exists in said shared area as a start point, the defect management information being recorded with another predetermined point which exists at a different point from the one point as a start point, in said shared area, wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area, in the shared area, the evacuation data is separately recorded from the defect management information, an area portion in the shared area, into which the evacuation data is recorded, is outer than an area portion in the shared area, into which the defect management information is recorded, said reproducing apparatus comprising:
   a reading device for reading the defect management information recorded in said shared area; and
   a reproducing device for reproducing the record data recorded in said data area or the evacuation data recorded in said shared area, on the basis of the defect management information.

7. A reproducing method of reproducing the record data recorded on a write-once-type recording medium comprising:
   (i) a data area to record therein the record data;
   (ii) a control information recording area, which includes a definite defect management area to record therein defect management information of said data area, to record therein information for controlling at least one of operations of recording and reading in said data area; and
   (iii) a shared area, which is disposed between said control information recording area and said data area, to record therein evacuation data which is record data to be recorded at a position of a defect in said data area and to temporarily record therein the defect management information of said data area, the evacuation data being recorded with one predetermined point which exists in said shared area as a start point, the defect management information being recorded with another predetermined point which exists at a different point from the one point as a start point, in said shared area, wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area, in the shared area, the evacuation data is separately recorded from the defect management information, an area portion in the shared area, into which the evacuation data is recorded, is outer than an area portion in the shared area, into which the defect management information is recorded,
   said reproducing method comprising:
   a reading process of reading the defect management information recorded in said shared area; and
   a reproducing process of reproducing the record data recorded in said data area or the evacuation data recorded in said shared area, on the basis of the read defect management information.

8. A non-transitory computer readable medium with a computer program stored thereon for recording control, executed by a computer provided for a recording apparatus, said program making the computer function as at least one portion of a first recording device and a second recording device, said recording apparatus for recording record data onto a write-once-type recording medium comprising:
   (i) a data area to record therein the record data;
   (ii) a control information recording area, which includes a definite defect management area to record therein defect management information of said data area, to record therein information for controlling at least one of operations of recording and reading in said data area; and
   (iii) a shared area, which is disposed between said control information recording area and said data area, to record therein evacuation data which is record data to be recorded at a position of a defect in said data area and to temporarily record therein the defect management information of said data area, wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area,
   said recording apparatus comprising:
   said first recording device for recording the record data into said data area;
   said second recording device for recording the evacuation data and the defect management information into said shared area,
   said second recording device recording the evacuation data with one predetermined point which exists in said shared area as a start point, said second recording device recording the defect management information with another predetermined point which exists at a different point from the one point as a start point, in said shared area,
   said second recording device recording the evacuation data and the defect management information in such a manner that, in the shared area, the evacuation data is separately recorded from the defect management information,
   said second recording device recording the evacuation data and the defect management information in such a manner that an area portion in the shared area, into which the evacuation data is recorded, is outer than an area portion in the shared area, into which the defect management information is recorded.

9. A non-transitory computer readable medium with a computer program stored thereon for reproduction control, executed by a computer provided for a reproducing apparatus, said program making the computer function as at least one portion of a reading device and a reproducing device, said reproducing apparatus for reproducing the record data recorded on a write-once-type recording medium comprising:

(i) a data area to record therein the record data;

(ii) a control information recording area, which includes a definite defect management area to record therein defect management information of said data area, to record therein information for controlling at least one of operations of recording and reading in said data area; and (iii) a shared area, which is disposed between said control information recording area and said data area, to record therein evacuation data which is record data to be recorded at a position of a defect in said data area and to temporarily record therein the defect management information of said data area, the evacuation data being recorded with one predetermined point which exists in said shared area as a start point, the defect management information being recorded with another predetermined point which exists at a different point from the one point as a start point, in said shared area, wherein the defect management information includes (i) an evacuation source address which is an address of the position of the defect in the data area and (ii) an evacuation destination address which is an address of a recording position of the evacuation data, and further includes (iii) a start address of the data area, (iv) an end address of the data area and (v) a size of the shared area, in the shared area, the evacuation data is separately recorded from the defect management information, an area portion in the shared area, into which the evacuation data is recorded, is outer than an area portion in the shared area, into which the defect management information is recorded, said reproducing apparatus comprising:

said reading device for reading the defect management information recorded in said shared area; and said reproducing device for reproducing the record data recorded in said data area or the evacuation data recorded in said shared area, on the basis of the defect management information.

* * * * *